US012355521B2

(12) United States Patent
Venugopal et al.

(10) Patent No.: US 12,355,521 B2
(45) Date of Patent: Jul. 8, 2025

(54) PRECODER PREDICTION FOR UPLINK TRANSMISSION ENHANCEMENT

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/733,243

(22) Filed: Apr. 29, 2022

(65) Prior Publication Data
US 2023/0353201 A1    Nov. 2, 2023

(51) Int. Cl.
H04L 1/02    (2006.01)
H04B 7/0456    (2017.01)

(52) U.S. Cl.
CPC ................... H04B 7/0456 (2013.01)

(58) Field of Classification Search
CPC .................................... H04B 7/0456
USPC ........................................ 375/267
See application file for complete search history.

(56) References Cited

U.S. PATENT DOCUMENTS 9,705,707 B1    7/2017    Panah et al.
11,894,894 B2 *  2/2024   Saggar ................. H04B 7/0658
2008/0260059 A1 * 10/2008  Pan ....................... H04B 7/0417
                                                        375/260
2014/0294108 A1 * 10/2014  Etkin ................ H04L 25/03955
                                                        375/267
2018/0183503 A1 *  6/2018  Rahman ............... H04B 7/0645
2018/0242327 A1 *  8/2018  Frenne .................. H04L 5/0062
2018/0262242 A1 *  9/2018  Chakraborty ........ H04B 7/0665
2021/0028846 A1 *  1/2021  Tosato ................ H04B 7/0639
2021/0036822 A1 *  2/2021  Lyu ....................... H04L 5/0048
2021/0176776 A1 *  6/2021  Choi ..................... H04L 1/1819
2022/0123799 A1 *  4/2022  Varatharaajan ....... H04L 5/0048

FOREIGN PATENT DOCUMENTS

AU    2008242610 A1 * 10/2008
CA        2910459 C  *  7/2018

* cited by examiner

Primary Examiner — Helene E Tayong
(74) Attorney, Agent, or Firm — Holland & Hart LLP

(57) ABSTRACT

Methods, systems, and devices for wireless communications are described. A user equipment (UE) may receive a control message indicating at least two precoding matrices and a set of weighting coefficients. The at least two precoding matrices and the set of weighting coefficients may be indicated to the UE for deriving a precoder for uplink transmission from the at least two precoding matrices. The UE may derive the precoder for transmission of an uplink message based on interpolating or extrapolating the at least two precoding matrices using the set of weighting coefficients. The UE may transmit the uplink message. The uplink message may be precoded using the precoder.

28 Claims, 20 Drawing Sheets

PRECODER PREDICTION FOR UPLINK TRANSMISSION ENHANCEMENT

FIELD OF TECHNOLOGY

The following relates to wireless communications, including precoder prediction for uplink transmission enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some communication devices may support codebook based precoding, non-codebook based precoding, or both.

SUMMARY

The described techniques relate to improved methods, systems, devices, and apparatuses that support precoder prediction for uplink transmission enhancement. For example, the described techniques may provide for derivation of a precoder at a communication device, such as a user equipment (UE), based on precoding matrices and weighting coefficients indicated to the UE by the network. In some examples, the UE may receive a control message indicating at least two precoding matrices and a set of weighting coefficients for deriving a precoder for uplink transmission from the at least two precoding matrices. The UE may derive the precoder for transmission of an uplink message based on interpolating or extrapolating the at least two precoding matrices using the set of weighting coefficients. The UE may transmit the uplink message and the uplink message may be precoded using the precoder. Such techniques may increase the reliability of wireless communications between the UE and the network, among other benefits.

A method for wireless communication at a UE is described. The method may include receiving a control message indicating at least two precoding matrices and a set of weighting coefficients for deriving a precoder for uplink transmission from the at least two precoding matrices, deriving the precoder for transmission of an uplink message based on interpolating or extrapolating the at least two precoding matrices using the set of weighting coefficients, and transmitting the uplink message, where the uplink message is precoded using the precoder.

An apparatus for wireless communication at a UE is described. The apparatus may include a processor, memory coupled with the processor, and instructions stored in the memory. The instructions may be executable by the processor to cause the apparatus to receive a control message indicating at least two precoding matrices and a set of weighting coefficients for deriving a precoder for uplink transmission from the at least two precoding matrices, derive the precoder for transmission of an uplink message based on interpolating or extrapolating the at least two precoding matrices using the set of weighting coefficients, and transmit the uplink message, where the uplink message is precoded using the precoder.

Another apparatus for wireless communication at a UE is described. The apparatus may include means for receiving a control message indicating at least two precoding matrices and a set of weighting coefficients for deriving a precoder for uplink transmission from the at least two precoding matrices, means for deriving the precoder for transmission of an uplink message based on interpolating or extrapolating the at least two precoding matrices using the set of weighting coefficients, and means for transmitting the uplink message, where the uplink message is precoded using the precoder.

A non-transitory computer-readable medium storing code for wireless communication at a UE is described. The code may include instructions executable by a processor to receive a control message indicating at least two precoding matrices and a set of weighting coefficients for deriving a precoder for uplink transmission from the at least two precoding matrices, derive the precoder for transmission of an uplink message based on interpolating or extrapolating the at least two precoding matrices using the set of weighting coefficients, and transmit the uplink message, where the uplink message is precoded using the precoder.

In some examples of the method, apparatuses, and non-transitory computer-readable medium described herein, receiving the control message indicating the at least two precoding matrices and the set of weighting coefficients may include operations, features, means, or instructions for receiving the control message indicating that a first precoding matrix of the at least two precoding matrices may be associated with a first time, and indicating that a second precoding matrix of the at least two precoding matrices may be associated with a second time and receiving a second control message scheduling the transmission of the uplink message at a third time.

In some examples of the method, apparatuses, and non-transitory computer-readable medium described herein, deriving the precoder for the transmission of the uplink message may include operations, features, means, or instructions for deriving the precoder for the transmission of the uplink message based on interpolating the first precoding matrix and the second precoding matrix using the set of weighting coefficients, where the third time occurs between the first time associated with the first precoding matrix and the second time associated with the second precoding matrix.

In some examples of the method, apparatuses, and non-transitory computer-readable medium described herein, deriving the precoder for the transmission of the uplink message may include operations, features, means, or instructions for deriving the precoder for the transmission of the uplink message based on extrapolating the first precoding matrix and the second precoding matrix using the set of weighting coefficients, where the third time occurs subsequent to both the first time associated with the first precoding matrix and the second time associated with the second precoding matrix.

In some examples of the method, apparatuses, and non-transitory computer-readable medium described herein, receiving the control message indicating the at least two precoding matrices and the set of weighting coefficients may include operations, features, means, or instructions for receiving the control message including a first PMI that indicates a first precoding matrix of the at least two precoding matrices and a second PMI that indicates a second precoding matrix of the at least two precoding matrices.

In some examples of the method, apparatuses, and non-transitory computer-readable medium described herein, the control message includes at least two bitmaps that respectively correspond to the first PMI and the second PMI.

In some examples of the method, apparatuses, and non-transitory computer-readable medium described herein, the control message includes a bitmap corresponding to the first PMI and a bitmap offset relative to the bitmap for determining the second PMI.

In some examples of the method, apparatuses, and non-transitory computer-readable medium described herein, receiving the control message indicating the at least two precoding matrices and the set of weighting coefficients may include operations, features, means, or instructions for receiving the control message that schedules a set of uplink message transmissions at a set of multiple times.

Some examples of the method, apparatuses, and non-transitory computer-readable medium described herein may further include operations, features, means, or instructions for deriving the precoder for each uplink message transmission of the set of uplink message transmissions based on interpolating or extrapolating the at least two precoding matrices using the set of weighting coefficients in accordance with a rule, the rule pertaining to a timing offset between a time in which the control message may be received and a respective time in which each uplink message transmission of the set of uplink message transmissions may be scheduled.

Some examples of the method, apparatuses, and non-transitory computer-readable medium described herein may further include operations, features, means, or instructions for receiving a second control message indicating activation of resources for transmission of the set of uplink message transmissions and deriving the precoder for each uplink message transmission of the set of uplink message transmissions based on interpolating or extrapolating the at least two precoding matrices using the set of weighting coefficients in accordance with a rule, the rule pertaining to a timing offset between a time in which the second control message may be received and a respective time in which a respective uplink message transmission of the set of uplink message transmissions may be scheduled.

In some examples of the method, apparatuses, and non-transitory computer-readable medium described herein, receiving the control message indicating the at least two precoding matrices and the set of weighting coefficients may include operations, features, means, or instructions for transmitting a set of SRSs over a set of SRS resources using a set of precoders and receiving the control message indicating at least two SRIs corresponding to the at least two precoding matrices.

A method is described. The method may include transmitting a control message indicating at least two precoding matrices and a set of weighting coefficients for deriving a precoder for uplink transmission from the at least two precoding matrices and receiving an uplink message, where the uplink message is precoded using the precoder.

An apparatus is described. The apparatus may include a processor, memory coupled with the processor, and instructions stored in the memory. The instructions may be executable by the processor to cause the apparatus to transmit a control message indicating at least two precoding matrices and a set of weighting coefficients for deriving a precoder for uplink transmission from the at least two precoding matrices and receive an uplink message, where the uplink message is precoded using the precoder.

Another apparatus is described. The apparatus may include means for transmitting a control message indicating at least two precoding matrices and a set of weighting coefficients for deriving a precoder for uplink transmission from the at least two precoding matrices and means for receiving an uplink message, where the uplink message is precoded using the precoder.

A non-transitory computer-readable medium storing code is described. The code may include instructions executable by a processor to transmit a control message indicating at least two precoding matrices and a set of weighting coefficients for deriving a precoder for uplink transmission from the at least two precoding matrices and receive an uplink message, where the uplink message is precoded using the precoder.

In some examples of the method, apparatuses, and non-transitory computer-readable medium described herein, transmitting the control message indicating the at least two precoding matrices and the set of weighting coefficients may include operations, features, means, or instructions for transmitting the control message indicating that a first precoding matrix of the at least two precoding matrices may be associated with a first time, and indicating that a second precoding matrix of the at least two precoding matrices may be associated with a second time and transmitting a second control message scheduling a transmission of the uplink message at a third time.

In some examples of the method, apparatuses, and non-transitory computer-readable medium described herein, transmitting the control message indicating the at least two precoding matrices and the set of weighting coefficients may include operations, features, means, or instructions for transmitting the control message including a first PMI that indicates a first precoding matrix of the at least two precoding matrices and a second PMI that indicates a second precoding matrix of the at least two precoding matrices.

In some examples of the method, apparatuses, and non-transitory computer-readable medium described herein, the control message includes at least two bitmaps that respectively correspond to the first PMI and the second PMI.

In some examples of the method, apparatuses, and non-transitory computer-readable medium described herein, the control message includes a bitmap corresponding to the first PMI and a bitmap offset relative to the bitmap for determining the second PMI.

In some examples of the method, apparatuses, and non-transitory computer-readable medium described herein, transmitting the control message indicating the at least two precoding matrices and the set of weighting coefficients may include operations, features, means, or instructions for transmitting the control message that schedules a set of uplink message transmissions at a set of multiple times.

Some examples of the method, apparatuses, and non-transitory computer-readable medium described herein may further include operations, features, means, or instructions for transmitting a second control message indication activation of resources for transmission of the set of uplink message transmissions.

In some examples of the method, apparatuses, and non-transitory computer-readable medium described herein, transmitting the control message indicating the at least two precoding matrices and the set of weighting coefficients may include operations, features, means, or instructions for receiving a set of SRSs over a set of SRS resources and transmitting the control message indicating at least two SRIs corresponding to the at least two precoding matrices.

DETAILED DESCRIPTION

Figure 1:
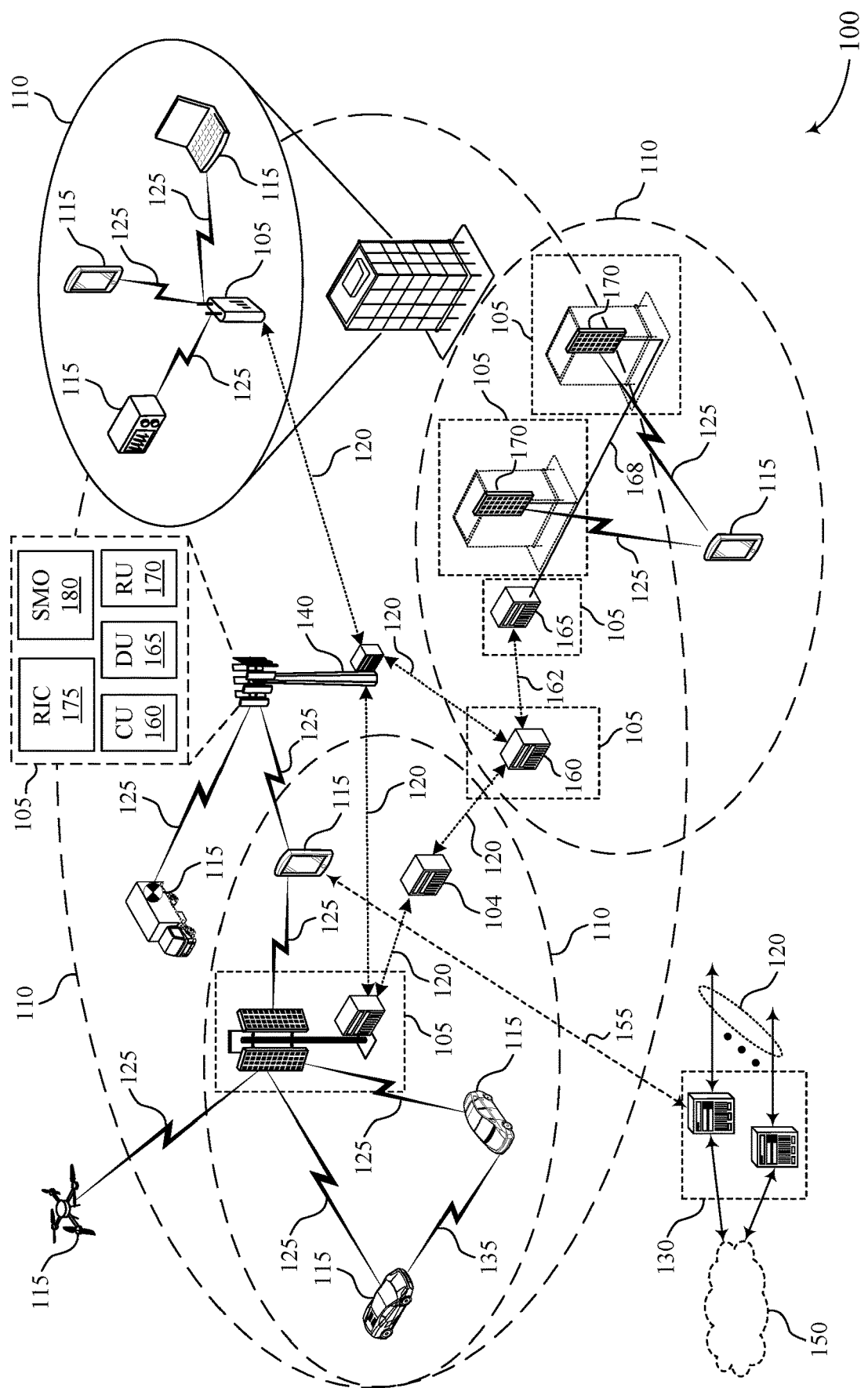
FIG. 1 illustrates an example of a wireless communications system that supports precoder prediction for uplink transmission enhancement in accordance with one or more aspects of the present disclosure.

Some wireless communications systems may support precoding operations for directional communications (e.g., beamforming). For example, wireless communication devices (e.g., user equipment (UE), network entities) operating within a wireless communications system may communicate via directional transmissions (e.g., beams), in which beamforming may be applied (e.g., using one or more antenna elements) to form a beam in a direction. In some examples of beamforming (e.g., for digital beamforming), signal processing techniques may be applied by a communication device (e.g., a transmitting communication device, a receiving communication device) to select, shape, or steer an antenna beam (e.g., a directional beam) along a spatial path between the communication device and one or more other communication devices. In some examples of beamforming, the spatial direction of the formed beam may depend on a set of parameters (e.g., a precoder, a precoding matrix) applied by the communication device (e.g., the communication device generating the beam).

In some examples, the communication device (e.g., a UE) may select a precoder (i.e., a beam) for directional communications (e.g., uplink communications) based on an indication from the network (e.g., one or more network entities). For example, a directional beam that may be suitable for uplink communications transmitted by the UE at one location (e.g., associated with some channel conditions) may not be suitable for uplink communications transmitting by the UE at another location (e.g., associated with some other channel conditions). As such, the network may indicate for the UE to use a directional beam based on channel conditions or a spatial location (or both) of the UE.

In some examples, however, the UE may be a mobile UE capable of traveling at relatively high speeds (e.g., 30-500 kmph). In such examples, the radio conditions experienced by the UE (e.g., the spatial location of the UE, the channel conditions) may change relatively quickly compared to a rate at which the network may update the precoder for the UE. For example, a propagation delay associated with the network transmitting a precoder indication to the UE and a processing delay associated with the UE applying the indicated precoder (e.g., to generate the beam) may be relatively long compared to the rate at which the channel conditions of the UE may change (e.g., due to the UE travel at relatively high speeds). As such, the precoder indicated to the UE may become outdated relatively quickly and may therefore degrade the performance of uplink communications transmitted by the UE. Moreover, increasing the rate (e.g., frequency) at which the network transmits a precoder indication to the UE (e.g., due to rapid changes in channel conditions of the UE) may lead to increased overhead and reduced system throughput.

Various aspects of the present disclosure generally relate to techniques for precoder prediction for uplink transmission enhancement, and more specifically, to techniques for precoder prediction by a communication device, such as a UE, using interpolation or extrapolation of precoding matrices indicated to the UE by the network. For example, the network may indicate two (or more) precoders and a set of weighting coefficients to the UE. A first precoder may be suitable for channel conditions experienced by the UE at a first time (e.g., a current time, a relatively recent time, a near future time) and a second precoder may be suitable for channel conditions experienced by the UE at a second time (e.g., a future time, a time subsequent to the first time). The UE may perform an interpolation (e.g., using the first precoder, the second precoder, and the weighting coefficients) to determine a suitable precoder for transmitting uplink communications at another time that may occur between the first time and the second time. The UE may perform an extrapolation to determine a suitable precoder for transmitting uplink communications at another time that may occur beyond (e.g., subsequent to) the second time. In some examples (e.g., for codebook based transmissions), the network may indicate the two (or more) precoders to the UE via one or more precoding matrix indicators (PMIs). In some other examples (e.g., for non-codebook based transmissions), the network may indicate the two (or more) precoders to the UE via one or more sounding reference signal (SRS) resource indicators (SRIs.)

Particular aspects of the subject matter described herein may be implemented to realize one or more of the following potential advantages. For example, the techniques employed by the described communication devices (e.g., the UE, the network entity) may provide benefits and enhancements to the operation of the communication devices, including enabling flexible precoder selection (e.g., prediction, derivation) for transmitting uplink communications. In some examples, operations performed by the described communication devices may provide improvements to the reliability of communications within a wireless communications system. In some examples, the operations performed by the described communication devices to improve communication reliability within the wireless communications system may include configuring a communication device with precoding matrices and weighting coefficients to predict a precoder for transmitting uplink communications using interpolation or extrapolation. In some other examples, operations performed by the described communication devices may also support increased throughput and higher data rates, among other benefits.

Aspects of the disclosure are initially described in the context of wireless communications systems. Aspects of the disclosure are also described in the context of a codebook based transmission scheme, a non-codebook based transmission scheme, other wireless communications systems, and a process flow. Aspects of the disclosure are further illustrated by and described with reference to apparatus diagrams, system diagrams, and flowcharts that relate to precoder prediction for uplink transmission enhancement.

FIG. 1 illustrates an example of a wireless communications system 100 that supports precoder prediction for uplink transmission enhancement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-*u*), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (LAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support precoder prediction for uplink transmission enhancement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Ne may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support one or more techniques for precoder prediction for uplink transmission enhancement. For example, the wireless communications system 100 may support precoder prediction (e.g., derivation) at a communication device, such as a UE 115, based on precoding matrices and weighting coefficients indicated to the UE 115 by the network (e.g., one or more network entities 105). In some examples, the UE 115 may receive a control message indicating at least two precoding matrices and a set of weighting coefficients for deriving a precoder for uplink transmission from the at least two precoding matrices. The UE 115 may derive the precoder for transmission of an uplink message based on interpolating or extrapolating the at least two precoding matrices using the set of weighting coefficients. The UE 115 may transmit the uplink message and the uplink message may be precoded using the precoder. In some examples, by enabling precoder prediction at the UE 115, the network may increase the reliability of wireless communications between the UE and the network, among other benefits.

Figure 2:
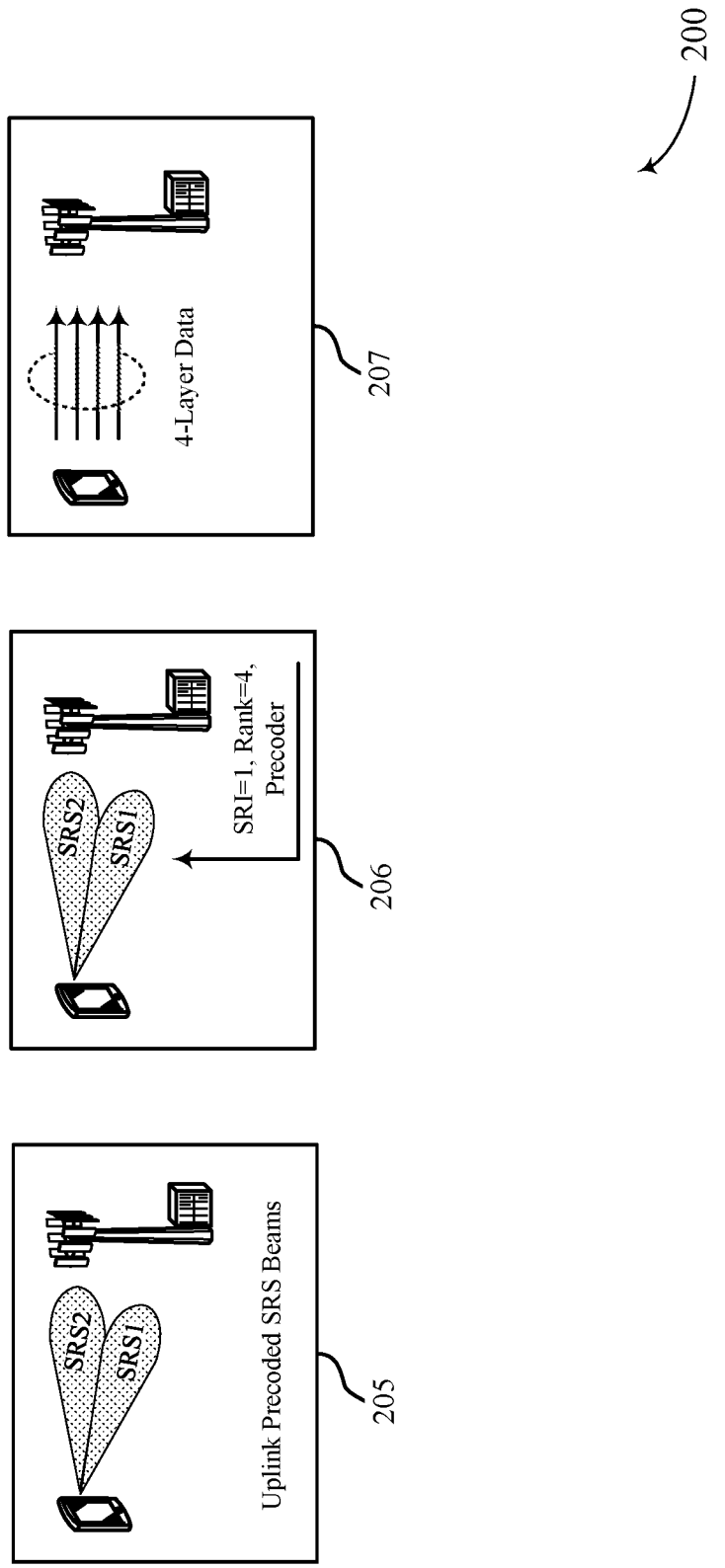
FIG. 2 illustrates an example of a codebook based transmission scheme that supports precoder prediction for uplink transmission enhancement in accordance with one or more aspects of the present disclosure.

FIG. 2 illustrates an example of a codebook based transmission scheme 200 that supports precoder prediction for uplink transmission enhancement in accordance with one or more aspects of the present disclosure. In some examples, the codebook based transmission scheme 200 may implement or be implemented by aspects of the wireless communications system 100. For example, the codebook based transmission scheme 200 may be implemented by a UE or a network entity which may be examples of the corresponding devices as described with reference to FIG. 1.

As illustrated in the example of FIG. 2, a wireless communications system may support codebook based precoder selection for directional (e.g., beamformed) communications between communication devices (e.g., one or more network entities, one or more UEs) operating within the wireless communication system. In some examples of codebook based precoder selection, a wireless communications network (e.g., one or more network entities) may configure a UE with a precoder for beamformed communications (e.g., directional uplink communications) with the network. In such examples (e.g., for codebook based precoder selection), reciprocity between an uplink channel and a downlink channel may not be assumed (e.g., for channel estimation). That is, the network (or the UE) may not (e.g., does not) assume reciprocity between uplink and downlink communication channels for codebook based precoder selection.

In some examples of codebook based precoder selection, the UE may send one or more beamformed multi-port SRSs in the uplink. For example, at 205, the UE may transmit multiple SRSs to the network via multiple beamforming directions (i.e., via multiple uplink precoded SRS beams). In such an example, each of the multiple SRSs may be transmitted over a respective SRS resource (e.g., a time and frequency resource allocated to the UE for transmitting an SRS, the resources represented as SRS1 and the SRS2) and may be precoded according to a respective precoder (e.g., precoding matrix). In some examples, each SRS may be (e.g., is expected to be) spatially beamformed with a different spatial filter. For example, the UE may use a spatial filter to transmit one or more SRSs over the SRS resource represented as SRS1 and another (e.g., a different) spatial filter to transmit one or more SRSs over the SRS resource represented as SRS 2.

In some examples, the network (e.g., one or more network entities, a gNB) may detect each SRS, select an SRS among the received SRSs (e.g., a best SRS, an SRS with a relatively high received signal strength, or an otherwise suitable SRS), choose a precoder on the SRS (e.g., a best precoder, a precoder associated with the selected SRS, or an otherwise suitable precoder), and inform the UE about the choice (e.g., indicate the selected SRS, or the selected precoder, or both to the UE). In some examples, the network may determine a suitable precoder based on channel estimation performed by the network using the multiple SRSs (e.g., transmitted by the UE at 205). For example, the network may estimate one or more characteristics of the channel based on measurements (e.g., reference signal received power (RSRP) measurements) performed on the multiple SRSs (e.g., transmitted by the UE at 205) and determine a suitable precoder based on the estimated channel characteristics.

The network may indicate the selected precoder (e.g., the choice of SRS) to the UE. In some examples, the network (e.g., the gNB) may indicate the choice of SRS (e.g., using an SRI), a rank of uplink transmission (e.g., a rank to be used for uplink transmissions), and a precoding matrix to be used on the indicated SRS. For example, the network may indicate, to the UE, the SRS resource over which the UE transmitted the selected SRS (e.g., via the SRI), a rank to be used by the UE for transmitting uplink communications, or a precoding matrix to be used by the UE for the transmitting uplink communications, or some combination thereof. In some examples, the network may transmit such an indication in a scheduled grant. The precoding matrix may be indicated to the UE via a PMI (or a transmit precoding matrix indicator (TPMI)) and the rank may be indicated to the UE via a rank indicator (RI).

As an illustrative example, at 206, the network may indicate, to the UE, an SRI value of about 1 (e.g., SRI=1), a rank value of about 4 (e.g., Rank=4), and a precoder. In such an example, the PMI (e.g., indicated by the UE at 206) may correspond to an entry of a codebook (e.g., configured at the UE). In some examples, the codebook (e.g., configured at the UE for determining a precoder based on the indicated PMI) may depend on a coherence of antenna ports at the UE. For example, codebooks (e.g., configured at the UE) may be different for different antenna port coherence assumptions, such as an assumption of full-, partial-, or no-coherence among antenna ports at the UE. In some examples, the UE may transmit uplink communications (e.g., to the network) based on the SRI, the rank, and the precoder indicated to the UE by the network. For example, at 207, the UE may transmit an uplink communication (e.g., 4-layer data) to the network using the precoder indicated to the UE (e.g., by the network at 206).

In some examples, however, the channel conditions of the UE may change relatively frequently. For example, the UE may be a mobile UE capable of traveling at relatively high speeds compared to a rate at which the network may indicate a precoder to the UE. In such an example (e.g., if the channel conditions of the UE change rapidly), a precoder indicated to the UE (e.g., by the network) may becoming outdated relatively quickly and degrade wireless communications between the UE and the network. For example, an outdated precoder (e.g., a precoder not suitable for channel conditions experienced by the UE) may degrade uplink communications transmitted by the UE (e.g., using the outdated precoder). In some examples, techniques for precoder prediction for uplink transmissions, as described herein, may enable the UE to predict (e.g., select, derive) a precoder for the uplink transmissions based on channel conditions of the UE, thereby providing one or more enhancements wireless communications between the UE and the network.

Figure 3:
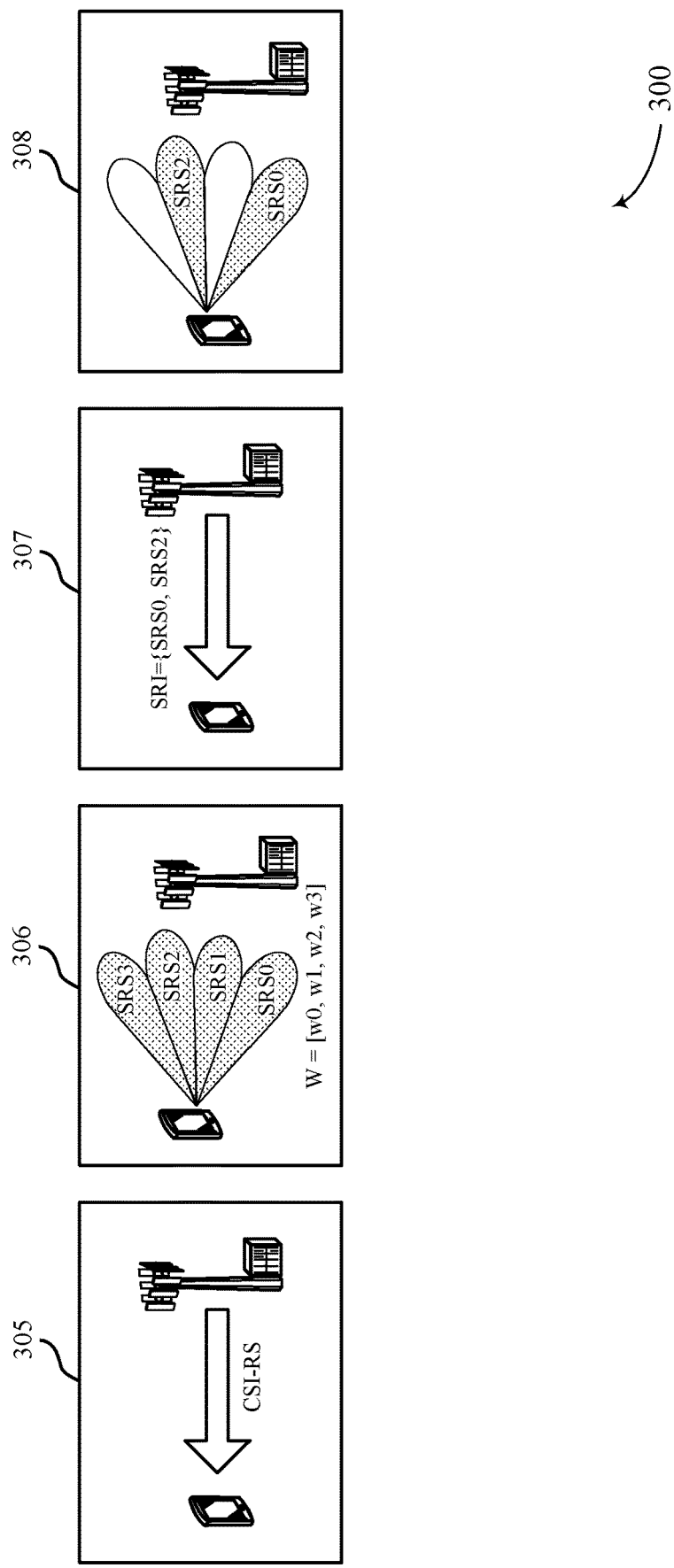
FIG. 3 illustrates an example of a non-codebook based transmission scheme that supports precoder prediction for uplink transmission enhancement in accordance with one or more aspects of the present disclosure.

FIG. 3 illustrates an example of a non-codebook based transmission scheme 300 that supports precoder prediction for uplink transmission enhancement in accordance with one or more aspects of the present disclosure. In some examples, the non-codebook based transmission scheme 300 may implement or be implemented by aspects of the wireless communications system 100. For example, the non-codebook based transmission scheme 300 may be implemented by a UE or a network entity which may be examples of the corresponding devices as described with reference to FIG. 1.

As illustrated in the example of FIG. 3, a wireless communications system may support non-codebook based precoder selection for directional (e.g., beamformed) communications between communication devices (e.g., one or more network entities, one or more UEs) operating within the wireless communications system. In some examples of non-codebook based precoder selection, a communication device (e.g., the UE) may be configured to determine (e.g., calculate) a precoder for beamformed communications (e.g., direction uplink communications) with the network. In such examples (e.g., for non-codebook based precoder selection), a reciprocity between an uplink channel and a downlink channel may be assumed (e.g., by the UE, by the network). That is, the UE (or the network) may assume the uplink channel and the downlink channel are reciprocal. As such, the uplink channel may be inferred by the UE from the downlink channel (e.g., downlink communications transmitted by the network). In some examples, the UE may infer uplink channel conditions based on measurements performed by the UE on downlink reference signals (e.g., channel state information reference signals (CSI-RSs)) transmitted by the network. For example, at 305, the network (e.g., one or more network entities, a gNB) may transmit a CSI-RS (e.g., a potentially beamformed CSI-RS) in the downlink (e.g., over a downlink channel) and the UE may measure the channel (e.g., the downlink channel over which the CSI-RS is transmitted). That is, the UE may estimate the uplink channel based on measurements (e.g., RSRP measurements) performed on downlink reference signals transmitted from the network.

In some examples, the UE may select (e.g., choose) a number of layers (e.g., up to about four or an otherwise suitable number) to transmit uplink reference signals (e.g., SRSs) and the precoders of the selected layers (e.g., w0, 01, w2, and w3) based on the uplink channel estimation. At 306, the UE may send precoded SRSs on all of the layers in the uplink. For example, the UE may transmit the precoded SRSs (e.g., over the SRS resources represented as SRS0, SRS1, SRS2, and SRS3) according to a precoding matrix (W), that may be based on the precoders of the selected layers (e.g., W=[w0, w1, w2, w3]). The network (e.g., the gNB) may measure the SRSs and determine (e.g., decide) whether to allow or disallow transmission on each of the layers (e.g., each of the transmit layers used by the UE to send the precoded SRSs). For example, the network may perform one or more measurements on each SRS (e.g., transmitted by the UE at 306) and determine which transmit layer (or which SRS resource over which an SRS was transmitting) may be used by the UE for transmitting uplink signals.

In such an example, the network (e.g., the gNB) may indicate, to the UE, the layers the UE may transmit on (i.e., the network may indicate the determined transmit layer or SRS resource to be used by the UE for transmitting uplink signals). For example, at 307, the network may transmit an indication of one or more transmit layers (or one or more SRS resources associated with the one or more transmit layers) that the network determined to allow transmissions (e.g., uplink transmissions) by the UE. As illustrated in the example of FIG. 3, the network may transmit such an indication via an SRI (e.g., SRI={SRS0, SRS2}) In some examples, the network may indicate the layers in a downlink message, such as in a scheduling grant.

The UE may select (e.g., determine, calculate) a precoder to use for uplink transmissions based on the layers indicated by the network. For example, the UE may select a precoder for uplink transmissions based on the precoders used by the UE to transmit SRSs over the SRS resources indicated by the network (e.g., the SRS resources indicated via the SRI and represented as SRS0 and SRS2). Accordingly, at 308, the UE may use the precoders corresponding to the SRS resources indicated by the network (e.g., via the SRI, the precoders corresponding to the resources represented as SRS0 and SRS2) to transmit uplink communications to the network. In some examples, the UE may use the set of layers (e.g., a final set of layers, the layers indicate to the UE by the network) and the corresponding precoders to send uplink transmissions, such as PUSCH transmissions, to the network.

In some examples, however, the transmit layers indicated to the UE by the network may become outdated, for example due to relatively frequency changes in the channel conditions experienced by the UE. In such an example, the outdated transmit layers (e.g., indicated to the UE by the network) may decrease the performance of (e.g., may degraded) uplink communications transmitted by the UE. Some techniques for precoder prediction, as described herein, may enable the UE to predict (e.g., select, derive) a precoder based on channel conditions of the UE, thereby providing one or more enhancements wireless communications between the UE and the network.

Figure 4:
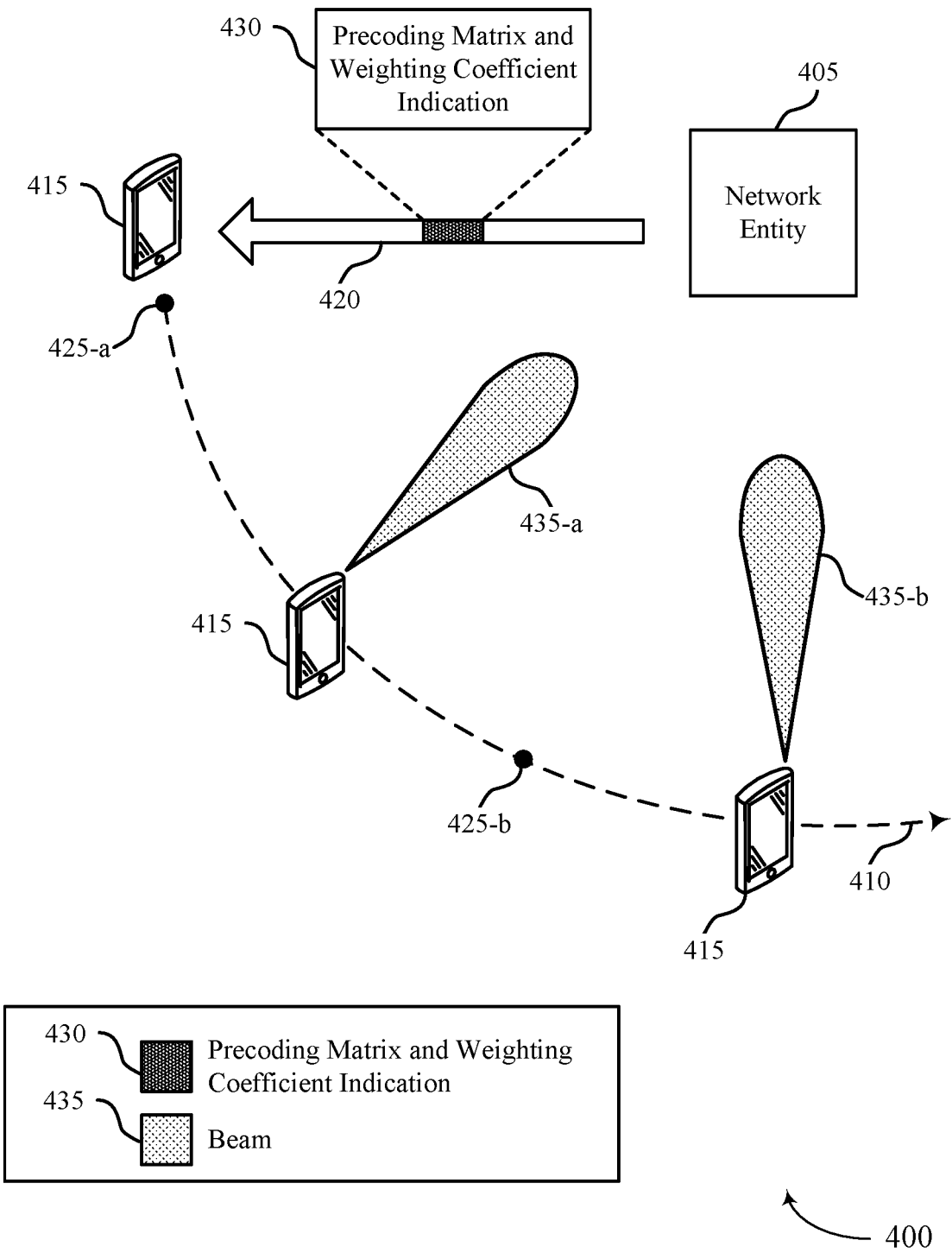
FIGS. 4 and 5 each illustrate an example of a wireless communications system that supports precoder prediction for uplink transmission enhancement in accordance with one or more aspects of the present disclosure.

FIG. 4 illustrates an example of a wireless communications system 400 that supports precoder prediction for uplink transmission enhancement in accordance with one or more aspects of the present disclosure. In some examples, the wireless communications system 400 may implement or be implemented by aspects of the wireless communications system 100. For example, the wireless communications system 400 may include a UE 415 and a network entity 405, which may be examples of the corresponding devices as described with reference to FIG. 1. The wireless communications system 400 may implement or be implemented by aspects of the codebook based transmission scheme 200 and the non-codebook based transmission scheme 300. For example, the UE 415 or the network entity 405 (or both) may support codebook based precoder selection as described with reference to FIG. 2 or non-codebook based precoder selection as described with reference to FIG. 3, or both.

In some examples of the wireless communications system 400, the UE 415 may support precoding operations for directional communications (e.g., beamforming). For example, the UE 415 may communicate with the network entity 405 via directional transmissions (e.g., beams), in which beamforming (e.g., digital beamforming) may be applied (e.g., using one or more antenna elements) to select, shape, or steer an antenna beam (e.g., a directional beam) along a spatial path between the UE 415 and the network entity 405. In some examples, the UE 415 may apply beamforming to account for intervening objects (e.g., blockers) or reflectors in the surrounding area of the UE 415. In some examples, the spatial direction of a beam generated by the UE 415 (e.g., via beamforming) may depend on a set of parameters (e.g., a precoder, a precoding matrix) applied by the UE 415.

The UE 415 may select a precoder (e.g., a beam, a beamforming direction) for transmitting uplink communications to the network entity 405 based on an indication from the network entity 405. For example, the UE 415 may be a mobile UE and a directional beam that may be suitable for the UE 415 to transmit uplink communications from one location (e.g., associated with some channel conditions) may not be suitable for the UE 415 to transmit uplink communications transmitting from another location (e.g., associated with some other channel conditions). That is, a beam suitable for uplink transmissions by the UE 415 may change as the UE 415 changes spatial locations, such as while traveling along a path 410. As such, the network entity 405 may indicate for the UE 415 to use a directional beam based on the channel conditions or the spatial location (or both) of the UE 415. In some examples, however, the UE 415 may be capable of traveling at relatively high speeds (e.g., speeds ranging from about 30 kmph to about 500 kmph or an otherwise suitable speed). For example, the UE 415 may be an example of an automotive vehicle traveling on a highway, an industrial IoT (IIoT) device, or a high-speed train. In such examples, the radio conditions experienced by the UE 415

(e.g., the spatial location of the UE 415, the channel conditions) may change relatively quickly compared to a rate at which the network entity 405 may update (e.g., transmit an indication of) a precoder for the UE 415.

For example, the network may configure the UE 415 for codebook based transmissions, in which the network (e.g., the network entity 405, a gNB) may indicate a PMI to the UE 415 via a DCI. However, the indicated PMI may become outdated relatively quickly due to channel variations (e.g., due to the UE 415 traveling at relatively high speeds). For example, a propagation delay associated with the network entity 405 transmitting an indication of a PMI to the UE 415 and a processing delay associated with the UE 415 applying the indicated PMI (e.g., applying a precoder associated with the indicated PMI) may be relatively long compared to the rate at which (e.g., a time duration over which) channel conditions of the UE 415 may change, which may lead to the indicated PMI becoming outdated relatively quickly and may degrade the performance of uplink communications transmitted by the UE 415. That is, performance loss may occur if channel variation is relatively fast compared to the signaling rate of the PMI (e.g., from the network entity 405 to the UE 415). In some examples, to accommodate for increased speeds of the UE, the network may increase the frequency of downlink indications (e.g., that may include a relatively recent or latest PMI) based on channel tracking mechanisms implemented by the network (e.g., the network entity 405, the gNB). However, increasing the frequency at which the network entity 405 transmits PMI indications (e.g., downlink indications including a relatively recent PMI) to the UE may lead to increased (e.g., relatively higher) resource overhead which may impact (e.g., reduce) system throughput. Therefore, some (e.g., existing) signaling frameworks for codebook based uplink transmission may not be suitable for mobile UEs traveling at relatively moderate speeds, relatively high speeds, or otherwise suitable speeds.

In some examples, techniques for precoder prediction, as described herein, may provide one or more enhancements to uplink transmissions by a communication device (e.g., the UE 415). For example, such techniques may enable the UE 415 to interpolate or extrapolate a precoder (e.g., a PMI, an uplink PMI, a SRI, an uplink SRI) for uplink transmissions with assistance from the network entity 405 (e.g., with gNB assistance). In some examples, the network may enable precoder interpolation or extrapolation (e.g., PMI interpolation or extrapolation, SRI interpolation or extrapolation) at the UE 415 (e.g., for uplink transmission) by indicating multiple (e.g., at least two) precoding matrices and a set of weighting coefficients (e.g., interpolation weighting coefficients, extrapolation weighting coefficients, or both) to the UE 415. For example, the network may transmit a precoding matrix and weighting coefficient indication 430 (e.g., a control message) to the UE 415 via a communication link 420 (e.g., a downlink). In some examples, the communication link 420 may be an example of a communication link 125 as described with reference to FIG. 1.

The precoding matrix and weighting coefficient indication 430 may include an indication of a first precoding matrix associated with a first time and a second precoding matrix associated with a second time. In some examples of the wireless communications system 400, the UE 415 may be configured for codebook based transmissions (e.g., codebook based precoder selection). In such examples, the precoding matrix and weighting coefficient indication 430 may include a first PMI that indicates the first precoding matrix and a second PMI that indicates the second precoding matrix. In other examples of the wireless communications system, the UE 415 may be configured for non-codebook based transmissions (e.g., non-codebook based precoder selection), in which the UE 415 may transmit a set of reference signals, such as SRSs over a set of SRS resources using a set of precoders. In such examples; the precoding matrix and weighting coefficient indication 430 may indicate multiple (e.g., at least two) SRIs that correspond to the first precoding matrix and the second precoding matrix.

In some examples, the first precoding matrix may be suitable for uplink transmissions by the UE 415 at the first time (e.g., associated with the first precoding matrix). For example, the network may determine (or predict) channel conditions (or a location) of the UE 415 at the first time and based on the determined channel conditions the network may select (e.g., determine) a suitable precoding matrix for the UE 415 (e.g., the first precoding matrix) at the first time. The network may further determine (or predict) channel conditions (or a location) of the UE 415 at the second time and based on the determined channel conditions may select (e.g., determine) a suitable precoding matrix for the UE 415 (e.g., the second precoding matrix) at the second time.

As illustrated in the example of FIG. 4, the first precoding matrix may be suitable for uplink transmissions by the UE 415 at a location 425-*a* and the second precoding matrix may be suitable for uplink transmissions by the UE 415 at a location 425-*b*. As such, the UE 415 may perform an interpolation (e.g., using the first precoder, the second precoder, and the weighting coefficients) to determine (e.g., derive) a suitable precoder (e.g., a beam 435-*a*) for transmitting uplink communications to the network entity 405 at a time (or location) that may occur between the first time (e.g., the location 425-*a*) and the second time (e.g., the location 425-*b*). The UE 415 may perform an extrapolation to derive a suitable precoder (e.g., a beam 435-*b*) for transmitting uplink communications to the network entity 405 at a time (or location) that may occur beyond the second time (or the location 425-*b*). In some examples, by deriving a precoder for uplink transmissions based on interpolating or extrapolating the first precoding matrix and the second precoding matrix using the set of weighting coefficients, the UE 415 may provide one or more enhancements to uplink codebook (or non-codebook) precoder selection. In some examples, by providing enhancements to precoder selection, the UE 415 may enable one or more efficiencies for channel state information (CSI) mechanisms. For example, by deriving a suitable precoder for uplink transmissions, the UE 415 may increase the performance of the uplink transmissions, thereby increasing CSI mechanisms performed by the network (e.g., on the uplink transmissions)

Figure 5:
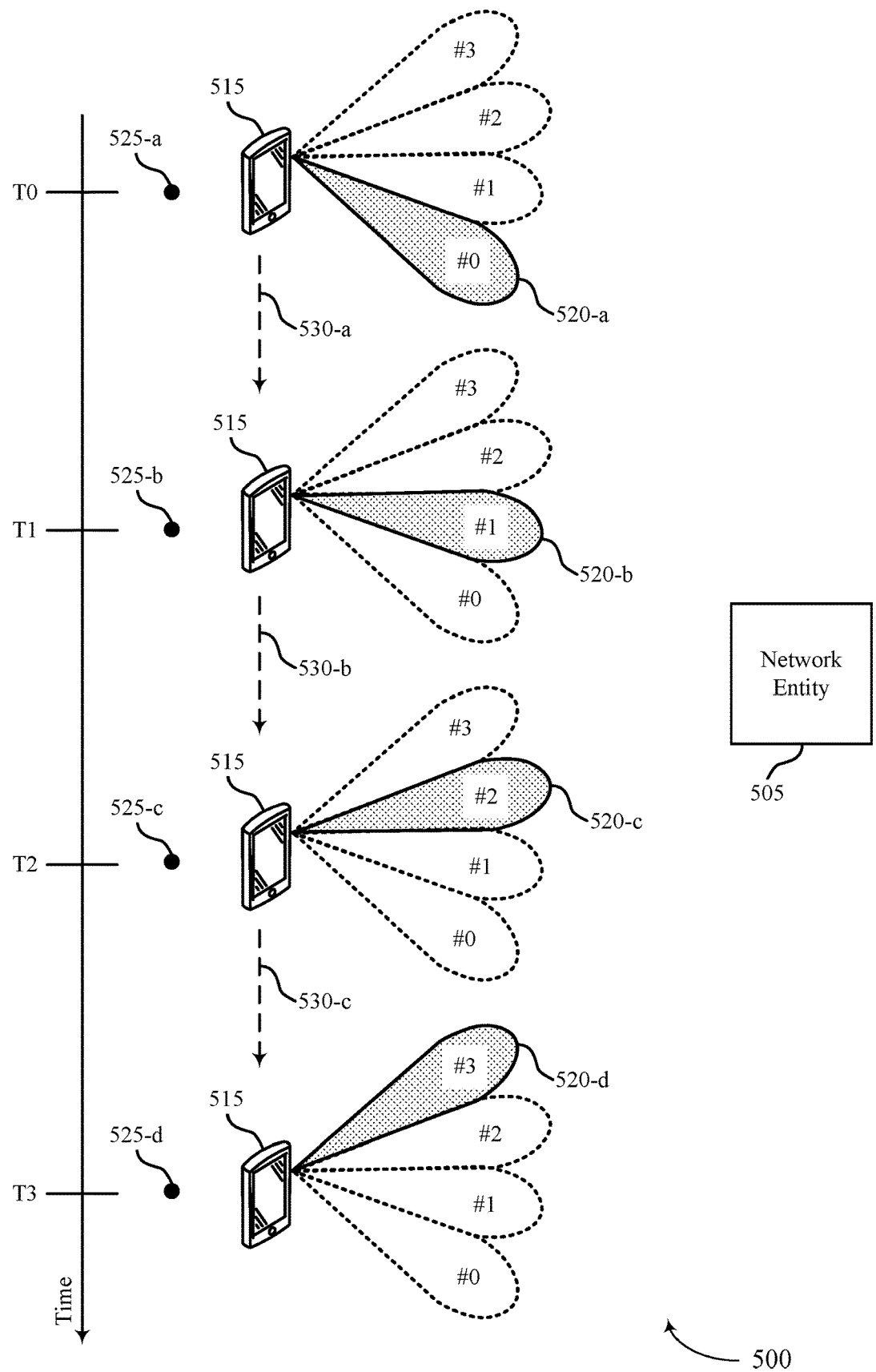

FIG. 5 illustrates an example of a wireless communications system 500 that supports precoder prediction for uplink transmission enhancement in accordance with one or more aspects of the present disclosure. In some examples, the wireless communications system 500 may implement or be implemented by aspects of the wireless communications system 100 and the wireless communications system 400. For example, the wireless communications system 500 may include a UE 515 and a network entity 505, which may be examples of the corresponding devices as described with reference to FIGS. 1 and 2. The wireless communications system 500 may implement or be implemented by aspects of the codebook based transmission scheme 200 and the non-codebook based transmission scheme 300. For example, the UE 515 or the network entity 505 (or both) may support codebook based precoder selection as described with reference to FIG. 2 or non-codebook based precoder selection as described with reference to FIG. 3, or both.

As illustrated in the example of FIG. 5, the UE 515 may be a mobile UE capable of traveling at relatively high speeds (e.g., speeds ranging from about 30 kmph to about 500 kmph or an otherwise suitable speed), such as an automotive vehicle traveling on a highway, an industrial IoT (IIOT) device, or a high-speed train. As such, the radio conditions experienced by the UE 515 (e.g., the spatial location of the UE 515, the channel conditions) may change relatively quickly (e.g., relatively frequently). Therefore, to increase the performance of uplink transmissions by the UE 515 (e.g., as the UE 515 travels along one or more paths 530), the network (e.g., the network entity 505, a gNB) may assist (e.g., aid, enable) the UE 515 for precoder prediction (e.g., PMI prediction, SRI prediction) by signaling multiple precoders (e.g., PMIs, SRIs) for uplink transmissions and weight coefficients to the UE 515. The UE 515 may track (e.g., accurately track) channel variations (e.g., changes in the location of the UE 515, changes in the channel conditions experienced by the UE 515) and use the indicated parameters (e.g., the multiple precoders and the weighting coefficients) to interpolate or extrapolate uplink precoders according to the tracked channel variations. In some examples, by using the indicated parameters to interpolate or extrapolate uplink precoders, the UE 515 may increase (e.g., effectively increase) the resolution of one or more codebooks (e.g., configured at the UE 515), thereby providing enhancements to codebook based precoder selection (e.g., irrespective of whether the UE 515 may be mobile). That is, some techniques for precoder prediction, as described herein, may provide one or more enhancements to codebook (or non-codebook) based transmissions in scenarios in which channel conditions may be relatively dynamic, relatively stationary, or both.

In some examples, the network entity 505 may transmit control signaling that may indicate a first precoding matrix that may be suitable for uplink transmissions by the UE 515 at a first time (T0) and a second precoding matrix that may be suitable for uplink transmissions by the UE 515 at a second time (T2). For example, the first precoding matrix may be suitable for uplink transmissions by the UE 515 at a location 525-a and the second precoding matrix may be suitable for uplink transmissions by the UE 515 at a location 525-c. As such, if the UE 515 is spatially located at the location 525-a, the UE 515 may apply (e.g., select) the first precoder to generate a beam 520-a (e.g., a beam corresponding to an index #0) for uplink communications with the network entity 505. In some examples, the UE 515 may travel along a path 530-a, such that at a third time (T1) the UE 515 may be spatially located at a location 525-b. The third time (T1) may occur (e.g., may be temporally located) between the first time and the second time and the location 525-b may occur (e.g., may be spatially located) between the location 525-a and the location 525-c. The network may schedule the UE 515 to transmit an uplink message at the third time (T1). As such (e.g., in response), the UE 515 may derive a precoder for transmission of the uplink message based on interpolating the first precoding matrix and the second precoding matrix using the set of weighting coefficients. In some examples, the UE 515 may transmit the uplink message using a beam 520-b (e.g., a beam corresponding to an index #1). That is, the uplink message transmitted by the UE at the third time (T1) may be precoded using the interpolated precoder (e.g., the precoder derived by the UE 515 using interpolation).

In some examples, the UE 515 may travel along a path 530-b, such that at the second time (T2) the UE 515 may be spatially located at the location 525-c. In such examples, if the network schedules the UE 515 to transmit an uplink message at the second time (T2), the UE 515 may apply the second precoder (e.g., indicated to the UE 515 by the network) to generate a beam 520-c (e.g., a beam corresponding to an index #2). That is, the uplink message transmitted by the UE at the second time (T3) may be precoded using the second precoding matrix. The UE 515 may travel along a path 530-c, such that at a fourth time (T3) the UE 515 may be spatially located at a location 525-d. The fourth time (T3) may occur (e.g., may be temporally located) subsequent to the second time and the location 525-d may occur (e.g., may be spatially located) beyond the location 525-c. The network may schedule the UE 515 to transmit an uplink message at the fourth time (T3), As such (e.g., in response), the UE 515 may derive a precoder for transmission of the uplink message based on extrapolating the first precoding matrix and the second precoding matrix using the set of weighting coefficients. In some examples, the UE 515 may transmit the uplink message using a beam 520-d (e.g., a beam corresponding to an index #3). That is, the uplink message transmitted by the UE at the fourth time (T3) may be precoded using the extrapolated precoder (e.g., the precoder derived by the UE 515 using extrapolation).

In some examples of the wireless communications system 500, the network (e.g., the network entity 505, the gNB) may indicate (e.g., signal, update) multiple precoders and weight coefficients to the UE 515 based on changes in channel conditions of the UE (e.g., detected by the network). For example, the network may track CSI variations using uplink measurements, prediction mechanisms, or UE reports (e.g., previous CSI reports transmitted by the UE 515) and signal at least two precoding matrices (e.g., via PMIs or SRIs) and interpolation weighting coefficients or extrapolation weighting coefficients (or both) to the UE 515. For codebook based uplink transmissions, the UE 515 may derive an uplink precoder (e.g., the actual UL precoder, a suitable uplink precoder) using indicated PMIs and weighting coefficients (e.g., the interpolation weighting coefficients, the extrapolation weighting coefficients, or both). For non-codebook-based uplink transmissions, the network entity 505 may indicate multiple SRIs (e.g., rather than PMI) and weighting coefficients may be indicated to the UE 515. That is, for non-codebook based transmissions, a precoder may be determined (e.g., derived) by the UE 515 based on SRIs (e.g., due to PMIs not being transmitted). In some examples, precoder selection for non-codebook based transmissions (e.g., non-codebook based precoder selection) may be based on implementations of the UE 515.

In some examples, the network (e.g., the network entity 505, the gNB) may indicate multiple (e.g., two) precoders and weighting coefficients (e.g., interpolation weighting coefficients, extrapolation weighting coefficients) to the UE 515 via a control message (e.g., a DCI message) that may be used to schedule uplink transmissions for the UE 515. The precoding matrices may be indicated to the UE 515 using PMIs (or SRIs). In some examples, the network may indicate PMI to the UE 515 via one or more bitmaps. For example, the network may indicate one or more bitmaps to the UE 515 and each bitmap may be associated with a PMI corresponding to a codebook (e.g., one or more codebooks configured at the UE 515). In some examples, the network may indicate two bitmaps to the UE 515 and each bitmap may correspond to a respective precoding matrix (e.g., a respective PMI corresponding to a precoding matrix). For example, the two bitmaps may respectively correspond to a first PMI and a second PMI. In other examples, the network may indicate two (or more) PMI to the UE 515 via one bitmap (e.g., a first bit map that corresponds to a first PMI) and an offset (e.g., a difference, a delta) to be used by the UE 515 to derive another bitmap (e.g., a second bitmap that corresponds to a second PMI). That is, the network may indicate a bitmap that corresponds to the first PMI and a bitmap offset relative to the bitmap for determining the second PMI.

In some examples, the network (e.g., the network entity 505, the gNB) may configure (or update indications of) multiple PMI (or SRI) and weighting coefficients (e.g., interpolation weighting coefficients, extrapolation weighting coefficients) to the UE 515 via control signaling (e.g., RRC signaling, a MAC control element (MAC-CE)), such as control signaling that may be used to schedule multiple uplink transmissions for the UE 515 (e.g., control signaling for scheduling semi-persistent traffic, control signaling for semi-persistent scheduling). In such examples, the UE 515 may be configured (e.g., pre-configured, configured via the network) with a rule for determining how to interpolate or extrapolate a precoder (e.g., using the indicated PMI or SRI and weighting coefficients) for each of the multiple uplink transmission scheduled for the UE 515. In some examples, the rule may be based on an offset between a time in which the UE 515 may receive the control signaling (e.g., a time which the UE 515 receives a downlink message) scheduling one or more uplink message transmissions and a time in which the UE 515 may transmit one or more of the uplink messages (e.g., a time in which one or more of the uplink message transmissions are scheduled).

For example, the UE 515 may receive control signaling (e.g., RRC signaling) that schedules a set of uplink message transmissions for the UE 515 at multiple (e.g., different) times (e.g., configures the UE 515 with multiple time and frequency domain resources for transmitting uplink message). In such an example, the UE 515 may derive the precoder for each uplink message transmission (e.g., of the scheduled set of uplink message transmissions) based on interpolating or extrapolating the indicated precoding matrices using the indicated set of weighting coefficients and according to a rule that may be based on a timing offset between a time in which the control message is received and a respective time in which each uplink message transmission is scheduled.

In some examples, the UE 515 may receive another control message (e.g., a MAC-CE) that may activate (e.g., indicating activation of) one or more resources (e.g., one or more of the time and frequency resources configured for the UE 515) for transmitting the set of uplink messages. In such examples, the UE 515 may derive the precoder for each uplink message transmission (e.g., of the set of uplink message transmissions) based on interpolating or extrapolating the indicated precoding matrices using the indicated set of weighting coefficients according to another rule that may be based on a timing offset between a time in which the other control message (e.g., the MAC-CE) is received and a respective time in which each uplink transmission is scheduled. In some examples, by configuring the UE 515 with precoding matrices and weighting coefficients to predict a precoder for transmitting uplink messages using interpolation or extrapolation the network may improve communication reliability within the wireless communications system 500, among other benefits.

Figure 6:
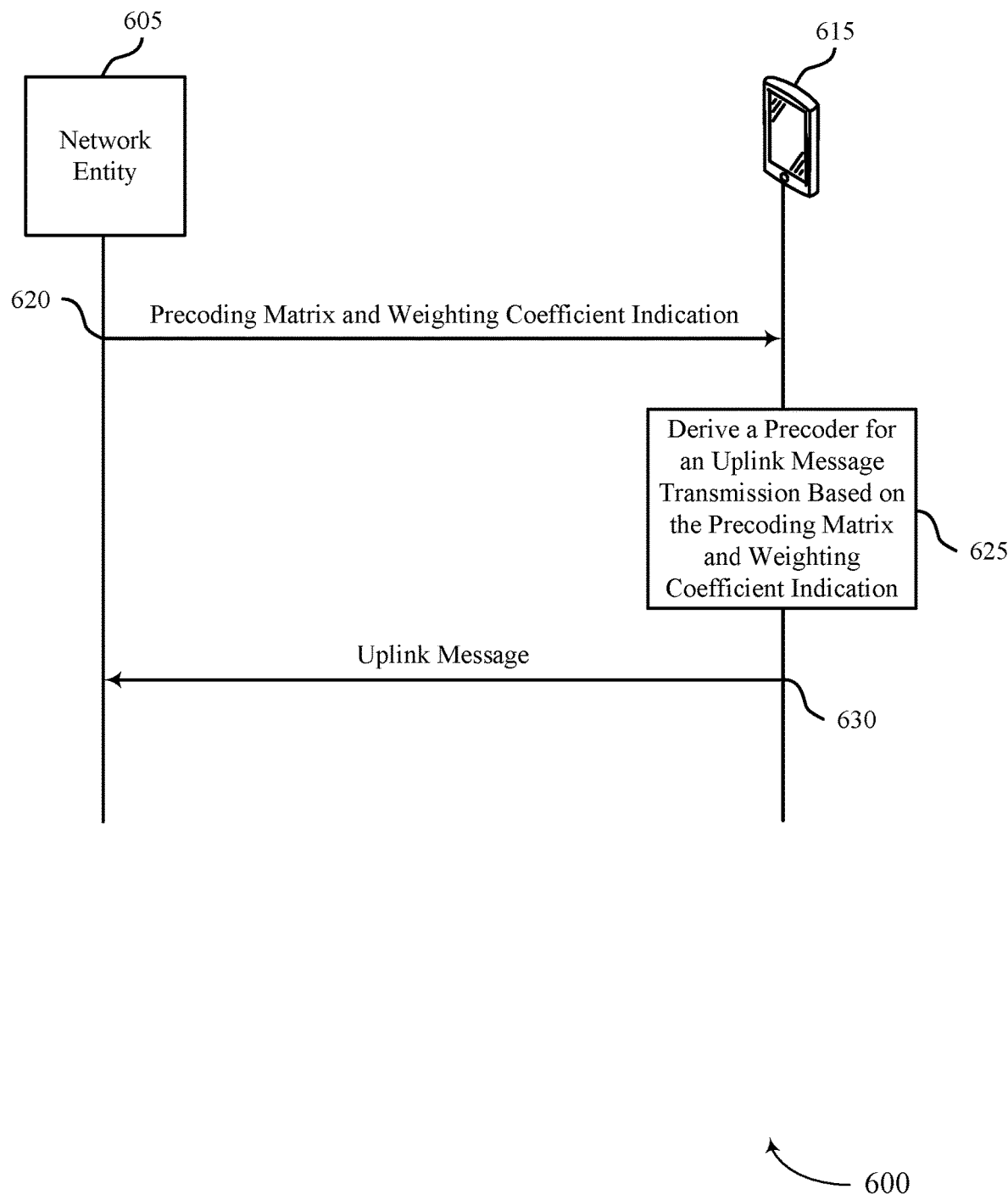
FIG. 6 illustrates an example of a process flow that supports precoder prediction for uplink transmission enhancement in accordance with one or more aspects of the present disclosure.

FIG. 6 illustrates an example of a process flow 600 that supports precoder prediction for uplink transmission enhancement in accordance with one or more aspects of the present disclosure. The process flow 600 may implement or be implemented by one or more aspects of the wireless communications system 100, the wireless communications system 400, and the wireless communications system 500. For example, the process flow 600 may include a UE 615 and a network entity 605, which may be examples of the corresponding devices as described with reference to FIGS. 1, 4, and 5. The process flow 600 may be implemented by the UE 615, the network entity 605, or both. In the following description of the process flow 600, operations between the UE 615 and the network entity 605, may occur in a different order or at different times than as shown. Some operations may also be omitted from the process flow 600, and other operations may be added to the process flow 600.

As illustrated in the example of FIG. 6, the network (e.g., the network entity 605) may enable the UE 615 to derive (e.g., predict, select) a precoder for uplink transmissions by signaling multiple precoders (e.g., PMIs, SRIs) and weight coefficients to the UE 615. For example, at 620, the UE 615 may receive a precoding matrix and weighting coefficient indication from the network entity 605. In some examples, the precoding matrix and weighting coefficient indication may be an example of the precoding matrix and weighting coefficient indication 430 as described with reference to FIG. 4. For example, the precoding matrix and weighting coefficient indication may be included in a control message and may indicate at least two precoding matrices and a set of weighting coefficients for deriving a precoder for uplink transmission from the at least two precoding matrices.

At 625, the UE 615 may derive a precoder (e.g., the precoder) for transmission of an uplink message based on the precoding matrix and weighting coefficient indication received by the UE 615 at 620. For example, the UE 615 may derive the precoder based on interpolating or extrapolating the at least two precoding matrices using the set of weighting coefficients. At 630, the UE 615 may transmit the uplink message. For example, the UE 615 may transmit the uplink message that may be precoded using the precoder. In some examples, by deriving a precoder for transmitting an uplink message based on interpolating or extrapolating at least two precoding matrices indicated to the UE 615 by the network using a set of weighting coefficients (e.g., also indicated to the UE 615 by the network), the UE 615 may increase the reliability of wireless communications between the UE 615 and the network, among other benefits.

Figure 7:
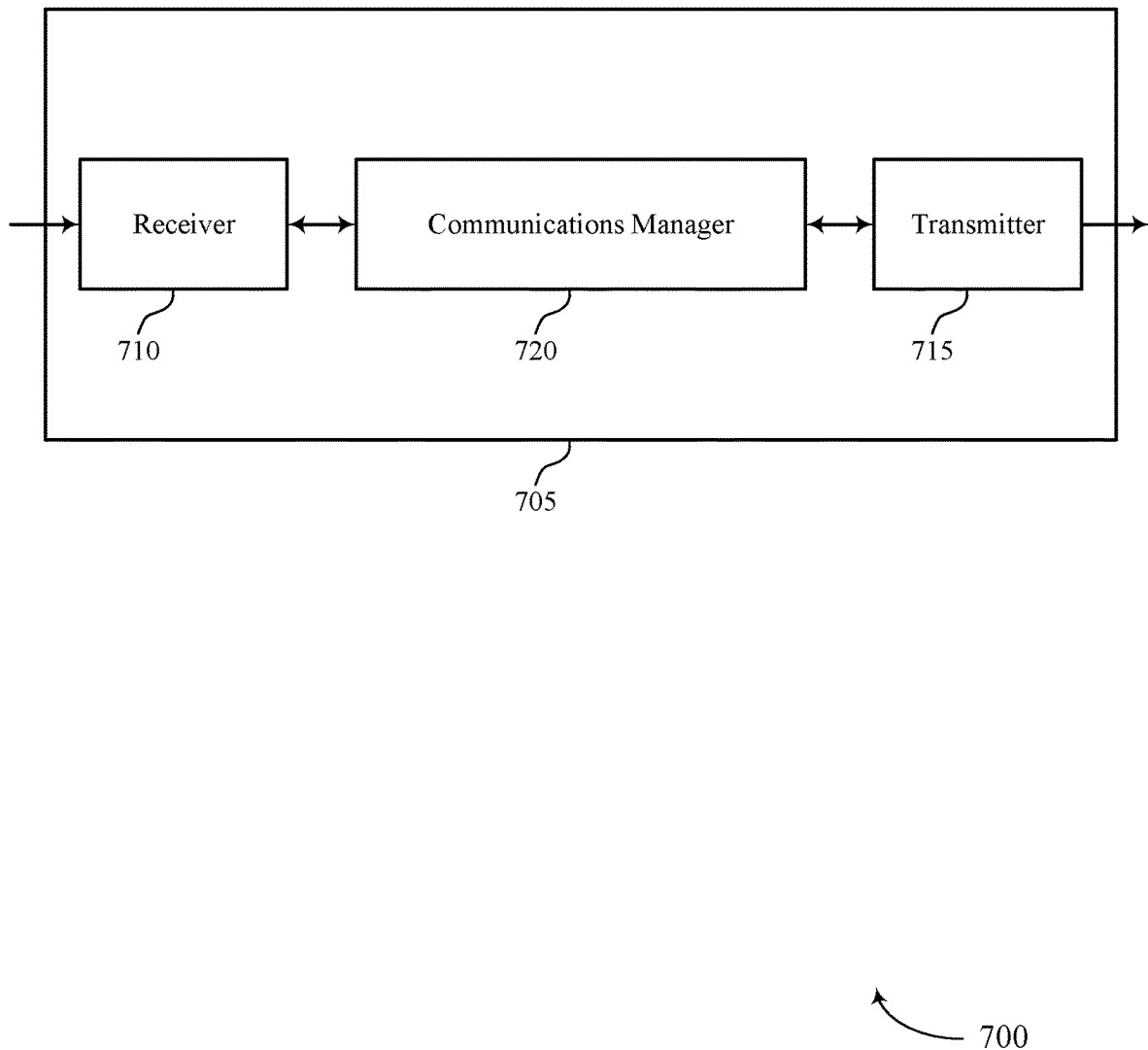
FIGS. 7 and 8 show block diagrams of devices that support precoder prediction for uplink transmission enhancement in accordance with one or more aspects of the present disclosure.

FIG. 7 shows a block diagram 700 of a device 705 that supports precoder prediction for uplink transmission enhancement in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to precoder prediction for uplink transmission enhancement). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to precoder prediction for uplink transmission enhancement). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of precoder prediction for uplink transmission enhancement as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (e.g., the device 705) in accordance with examples as disclosed herein. For example, the communications manager 720 may be configured as or otherwise support a means for receiving a control message indicating at least two precoding matrices and a set of weighting coefficients for deriving a precoder for uplink transmission from the at least two precoding matrices. The communications manager 720 may be configured as or otherwise support a means for deriving the precoder for transmission of an uplink message based on interpolating or extrapolating the at least two precoding matrices using the set of weighting coefficients. The communications manager 720 may be configured as or otherwise support a means for transmitting the uplink message, where the uplink message is precoded using the precoder.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing and more efficient utilization of communication resources.

Figure 8:
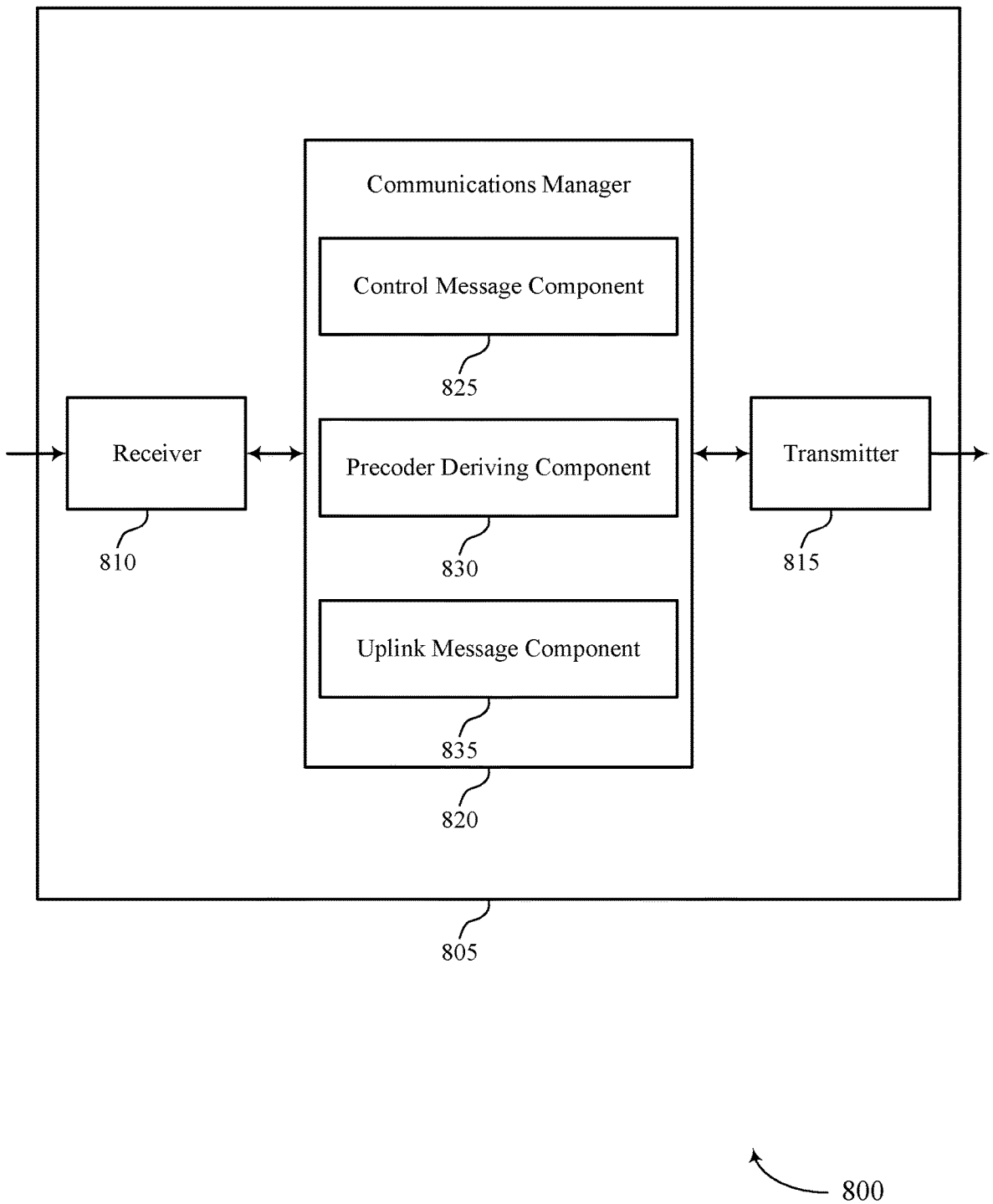

FIG. 8 shows a block diagram 800 of a device 805 that supports precoder prediction for uplink transmission enhancement in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to precoder prediction for uplink transmission enhancement). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to precoder prediction for uplink transmission enhancement). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of precoder prediction for uplink transmission enhancement as described herein. For example, the communications manager 820 may include a control message component 825, a precoder deriving component 830, an uplink message component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE (e.g., the device 805) in accordance with examples as disclosed herein. The control message component 825 may be configured as or otherwise support a means for receiving a control message indicating at least two precoding matrices and a set of weighting coefficients for deriving a precoder for uplink transmission from the at least two precoding matrices. The precoder deriving component 830 may be configured as or otherwise support a means for deriving the precoder for transmission of an uplink message based on interpolating or extrapolating the at least two precoding matrices using the set of weighting coefficients. The uplink message component 835 may be configured as or otherwise support a means for transmitting the uplink message, where the uplink message is precoded using the precoder.

Figure 9:
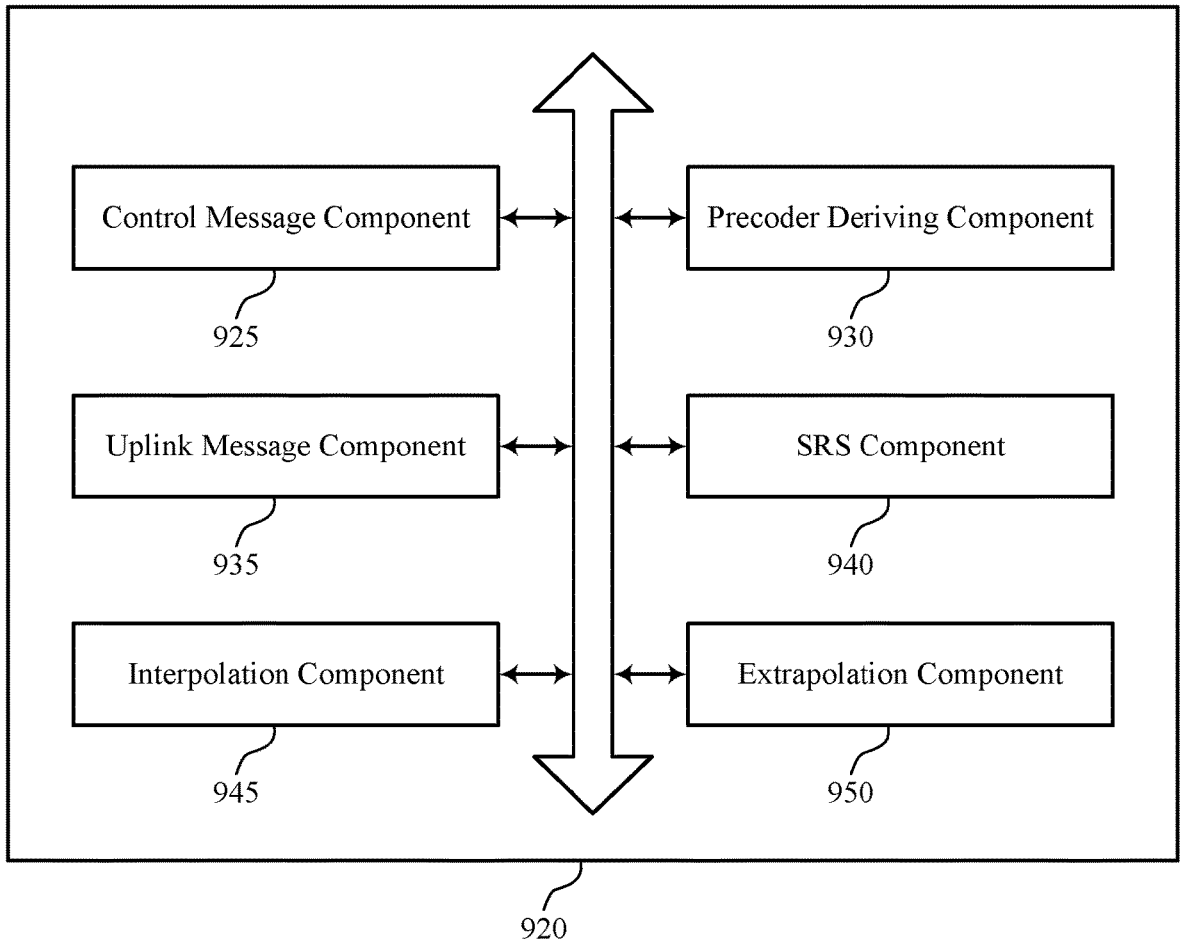
FIG. 9 shows a block diagram of a communications manager that supports precoder prediction for uplink transmission enhancement in accordance with one or more aspects of the present disclosure.

FIG. 9 shows a block diagram 900 of a communications manager 920 that supports precoder prediction for uplink transmission enhancement in accordance with one or more aspects of the present disclosure. The communications manager 920 may be an example of aspects of a communications manager 720, a communications manager 820, or both, as described herein. The communications manager 920, or various components thereof, may be an example of means for performing various aspects of precoder prediction for uplink transmission enhancement as described herein. For example, the communications manager 920 may include a control message component 925, a precoder deriving component 930, an uplink message component 935, an SRS component 940, an interpolation component 945, an extrapolation component 950, or any combination thereof. Each of these components may communicate, directly or indirectly, with one another (e.g., via one or more buses).

The communications manager 920 may support wireless communication at a UE in accordance with examples as disclosed herein. The control message component 925 may be configured as or otherwise support a means for receiving a control message indicating at least two precoding matrices and a set of weighting coefficients for deriving a precoder for uplink transmission from the at least two precoding matrices. The precoder deriving component 930 may be configured as or otherwise support a means for deriving the precoder for transmission of an uplink message based on interpolating or extrapolating the at least two precoding matrices using the set of weighting coefficients. The uplink message component 935 may be configured as or otherwise support a means for transmitting the uplink message, where the uplink message is precoded using the precoder.

In some examples, to support receiving the control message indicating the at least two precoding matrices and the set of weighting coefficients, the control message component 925 may be configured as or otherwise support a means for receiving the control message indicating that a first precoding matrix of the at least two precoding matrices is associated with a first time, and indicating that a second precoding matrix of the at least two precoding matrices is associated with a second time. In some examples, to support receiving the control message indicating the at least two precoding matrices and the set of weighting coefficients, the control message component 925 may be configured as or otherwise support a means for receiving a second control message scheduling the transmission of the uplink message at a third time.

In some examples, to support deriving the precoder for the transmission of the uplink message, the interpolation component 945 may be configured as or otherwise support a means for deriving the precoder for the transmission of the uplink message based on interpolating the first precoding matrix and the second precoding matrix using the set of weighting coefficients, where the third time occurs between the first time associated with the first precoding matrix and the second time associated with the second precoding matrix.

In some examples, to support deriving the precoder for the transmission of the uplink message, the extrapolation component 950 may be configured as or otherwise support a means for deriving the precoder for the transmission of the uplink message based on extrapolating the first precoding matrix and the second precoding matrix using the set of weighting coefficients, where the third time occurs subsequent to both the first time associated with the first precoding matrix and the second time associated with the second precoding matrix.

In some examples, to support receiving the control message indicating the at least two precoding matrices and the set of weighting coefficients, the control message component 925 may be configured as or otherwise support a means for receiving the control message including a first PMI that indicates a first precoding matrix of the at least two precoding matrices and a second PMI that indicates a second precoding matrix of the at least two precoding matrices.

In some examples, the control message includes at least two bitmaps that respectively correspond to the first PMI and the second PMI. In some examples, the control message includes a bitmap corresponding to the first PMI and a bitmap offset relative to the bitmap for determining the second PMI. In some examples, to support receiving the control message indicating the at least two precoding matrices and the set of weighting coefficients, the control message component 925 may be configured as or otherwise support a means for receiving the control message that schedules a set of uplink message transmissions at a set of multiple times.

In some examples, the precoder deriving component 930 may be configured as or otherwise support a means for deriving the precoder for each uplink message transmission of the set of uplink message transmissions based on interpolating or extrapolating the at least two precoding matrices using the set of weighting coefficients in accordance with a rule, the rule pertaining to a timing offset between a time in which the control message is received and a respective time in which each uplink message transmission of the set of uplink message transmissions is scheduled.

In some examples, the control message component 925 may be configured as or otherwise support a means for receiving a second control message indicating activation of resources for transmission of the set of uplink message transmissions. In some examples, the precoder deriving component 930 may be configured as or otherwise support a means for deriving the precoder for each uplink message transmission of the set of uplink message transmissions based on interpolating or extrapolating the at least two precoding matrices using the set of weighting coefficients in accordance with a rule, the rule pertaining to a timing offset between a time in which the second control message is received and a respective time in which a respective uplink message transmission of the set of uplink message transmissions is scheduled.

In some examples, to support receiving the control message indicating the at least two precoding matrices and the set of weighting coefficients, the SRS component 940 may be configured as or otherwise support a means for transmitting a set of SRSs over a set of SRS resources using a set of precoders. In some examples, to support receiving the control message indicating the at least two precoding matrices and the set of weighting coefficients, the control message component 925 may be configured as or otherwise support a means for receiving the control message indicating at least two SRIs corresponding to the at least two precoding matrices.

Figure 10:
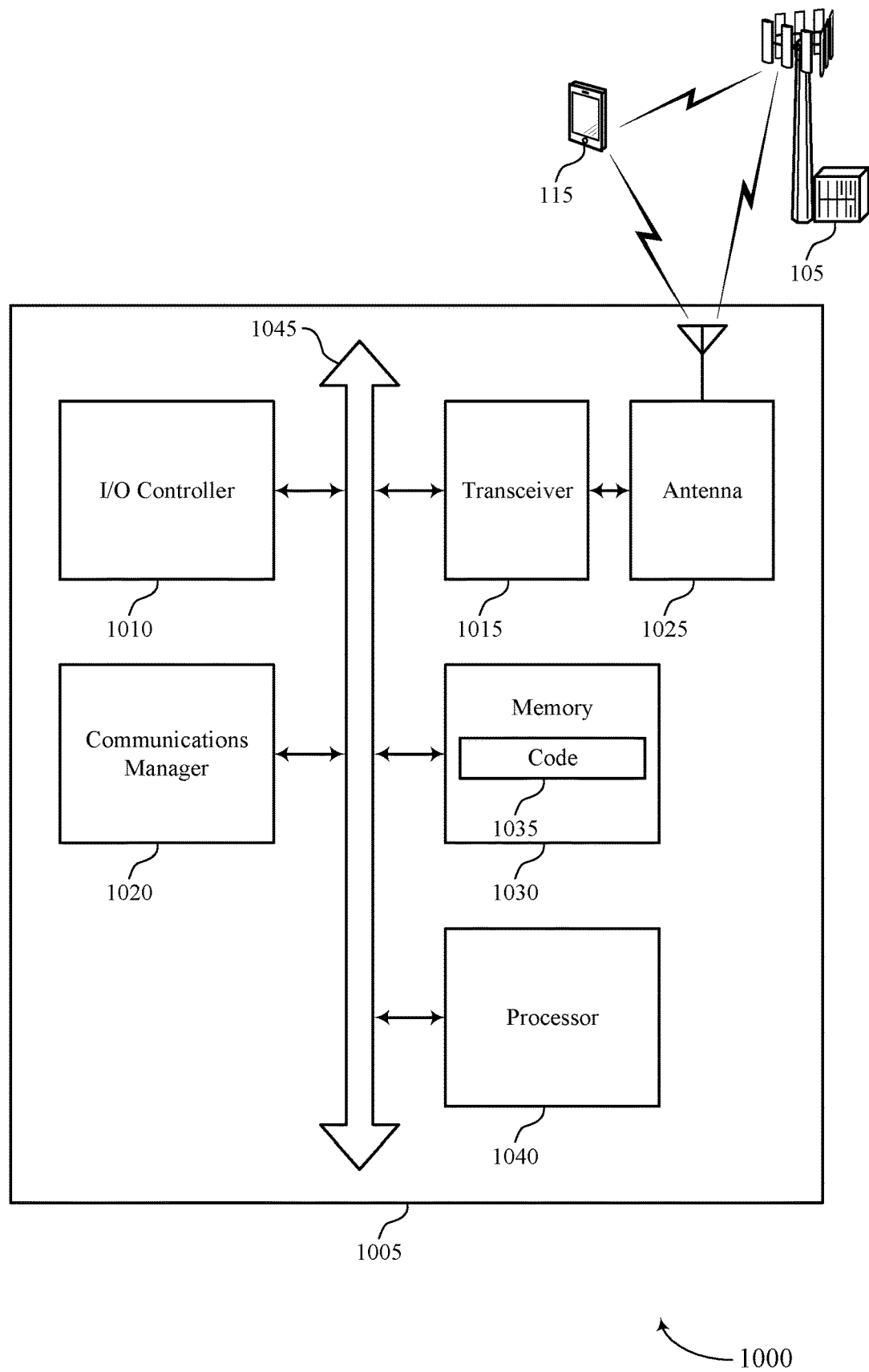
FIG. 10 shows a diagram of a system including a device that supports precoder prediction for uplink transmission enhancement in accordance with one or more aspects of the present disclosure.

FIG. 10 shows a diagram of a system 1000 including a device 1005 that supports precoder prediction for uplink transmission enhancement in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting precoder prediction for uplink transmission enhancement). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE (e.g., the device 1005) in accordance with examples as disclosed herein. For example, the communications manager 1020 may be configured as or otherwise support a means for receiving a control message indicating at least two precoding matrices and a set of weighting coefficients for deriving a precoder for uplink transmission from the at least two precoding matrices. The communications manager 1020 may be configured as or otherwise support a means for deriving the precoder for transmission of an uplink message based on interpolating or extrapolating the at least two precoding matrices using the set of weighting coefficients. The communications manager 1020 may be configured as or otherwise support a means for transmitting the uplink message, where the uplink message is precoded using the precoder.

By including or configuring the communications manager 1020 in accordance with examples as described herein, the device 1005 may support techniques for improved communication reliability, reduced latency, improved user experience related to reduced processing, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of precoder prediction for uplink transmission enhancement as described herein, or the processor 1040 and the memory 1030 may be otherwise configured to perform or support such operations.

Figure 11:
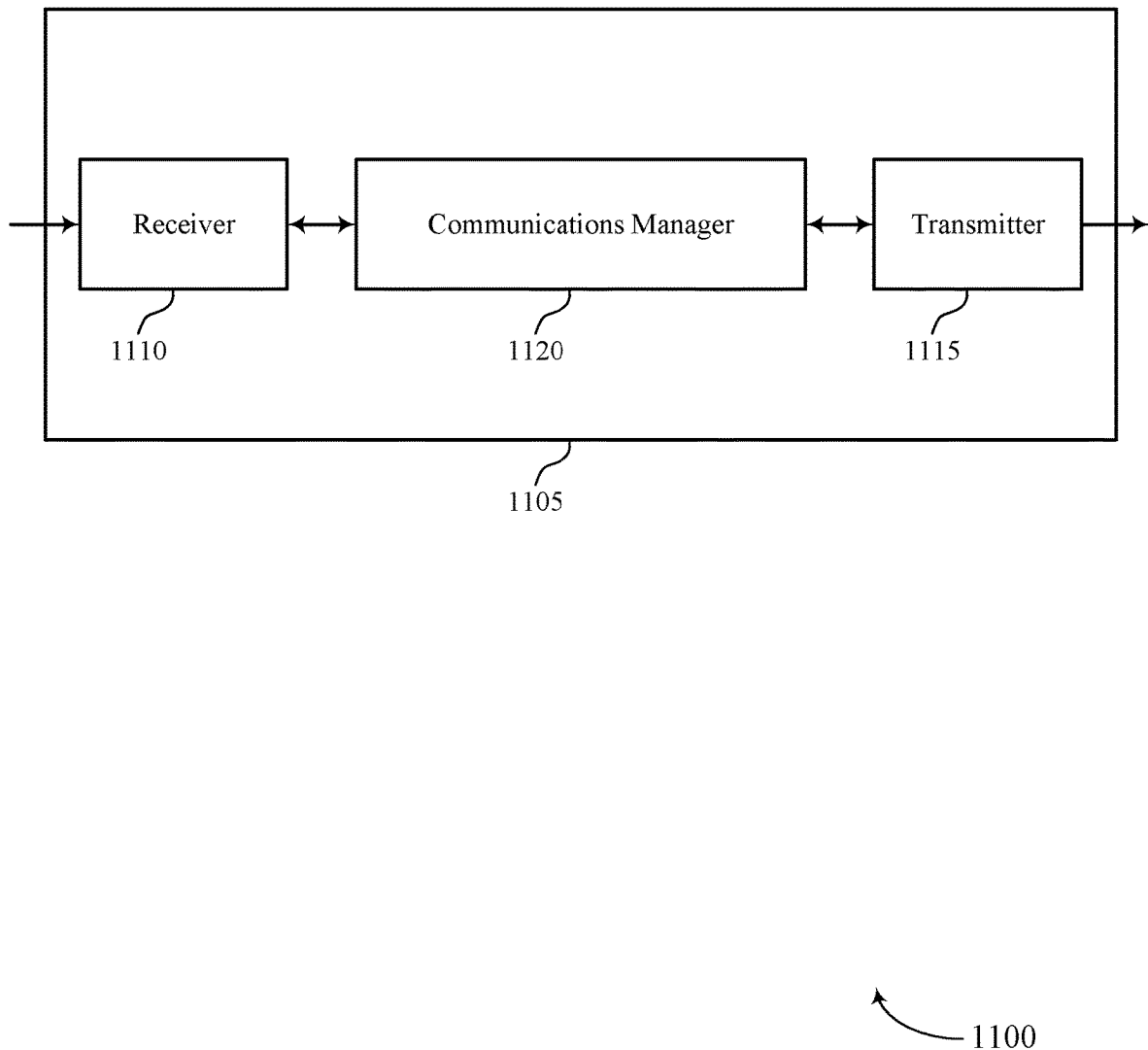
FIGS. 11 and 12 show block diagrams of devices that support precoder prediction for uplink transmission enhancement in accordance with one or more aspects of the present disclosure.

FIG. 11 shows a block diagram 1100 of a device 1105 that supports precoder prediction for uplink transmission enhancement in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of precoder prediction for uplink transmission enhancement as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

For example, the communications manager 1120 may be configured as or otherwise support a means for transmitting a control message indicating at least two precoding matrices and a set of weighting coefficients for deriving a precoder for uplink transmission from the at least two precoding matrices. The communications manager 1120 may be configured as or otherwise support a means for receiving an uplink message, where the uplink message is precoded using the precoder.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing and more efficient utilization of communication resources.

Figure 12:
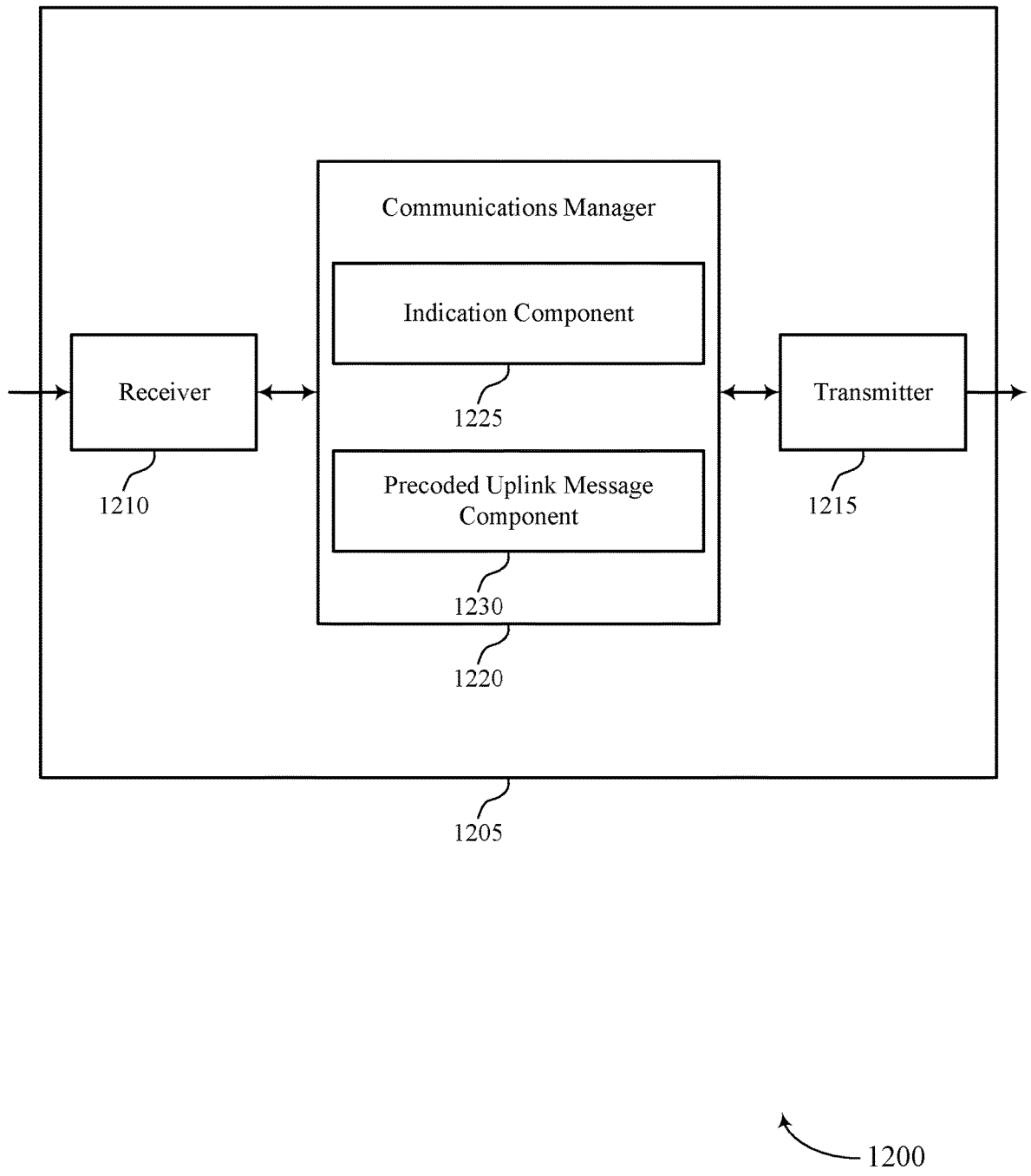

FIG. 12 shows a block diagram 1200 of a device 1205 that supports precoder prediction for uplink transmission enhancement in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of precoder prediction for uplink transmission enhancement as described herein. For example, the communications manager 1220 may include an indication component 1225 a precoded uplink message component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The indication component 1225 may be configured as or otherwise support a means for transmitting a control message indicating at least two precoding matrices and a set of weighting coefficients for deriving a precoder for uplink transmission from the at least two precoding matrices. The precoded uplink message component 1230 may be configured as or otherwise support a means for receiving an uplink message, where the uplink message is precoded using the precoder.

Figure 13:
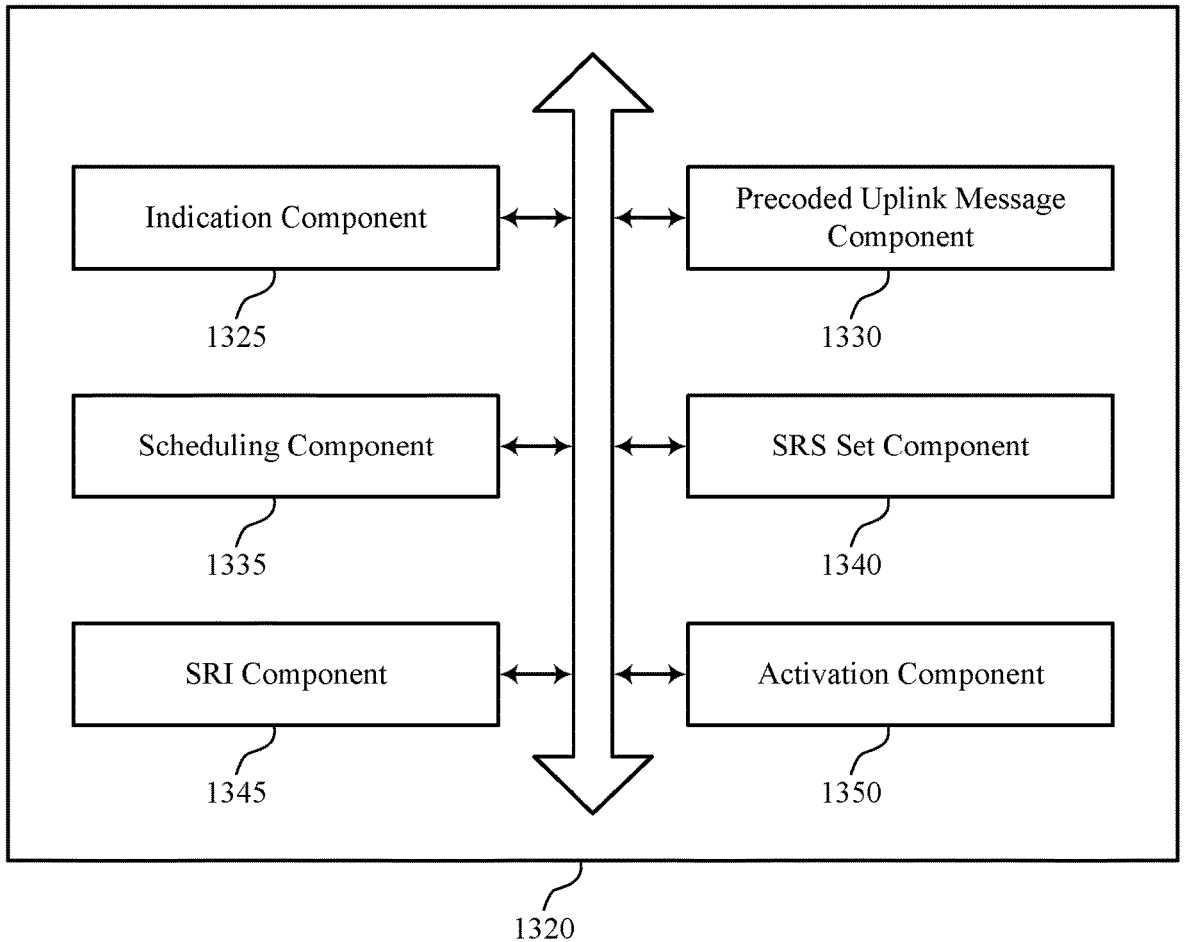
FIG. 13 shows a block diagram of a communications manager that supports precoder prediction for uplink transmission enhancement in accordance with one or more aspects of the present disclosure.

FIG. 13 shows a block diagram 1300 of a communications manager 1320 that supports precoder prediction for uplink transmission enhancement in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of precoder prediction for uplink transmission enhancement as described herein. For example, the communications manager 1320 may include an indication component 1325, a precoded uplink message component 1330, a scheduling component 1335, an SRS set component 1340, an SRI component 1345, an activation component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The indication component 1325 may be configured as or otherwise support a means for transmitting a control message indicating at least two precoding matrices and a set of weighting coefficients for deriving a precoder for uplink transmission from the at least two precoding matrices. The precoded uplink message component 1330 may be configured as or otherwise support a means for receiving an uplink message, where the uplink message is precoded using the precoder.

In some examples, to support transmitting the control message indicating the at least two precoding matrices and the set of weighting coefficients, the indication component 1325 may be configured as or otherwise support a means for transmitting the control message indicating that a first precoding matrix of the at least two precoding matrices is associated with a first time, and indicating that a second precoding matrix of the at least two precoding matrices is associated with a second time. In some examples, to support transmitting the control message indicating the at least two precoding matrices and the set of weighting coefficients, the scheduling component 1335 may be configured as or otherwise support a means for transmitting a second control message scheduling a transmission of the uplink message at a third time.

In some examples, to support transmitting the control message indicating the at least two precoding matrices and the set of weighting coefficients, the indication component 1325 may be configured as or otherwise support a means for transmitting the control message including a first PMI that indicates a first precoding matrix of the at least two precoding matrices and a second PMI that indicates a second precoding matrix of the at least two precoding matrices.

In some examples, the control message includes at least two bitmaps that respectively correspond to the first PMI and the second PMI. In some examples, the control message includes a bitmap corresponding to the first PMI and a bitmap offset relative to the bitmap for determining the second PMI. In some examples, to support transmitting the control message indicating the at least two precoding matrices and the set of weighting coefficients, the scheduling component 1335 may be configured as or otherwise support a means for transmitting the control message that schedules a set of uplink message transmissions at a set of multiple times. In some examples, the activation component 1350 may be configured as or otherwise support a means for transmitting a second control message indication activation of resources for transmission of the set of uplink message transmissions.

In some examples, to support transmitting the control message indicating the at least two precoding matrices and the set of weighting coefficients, the SRS set component 1340 may be configured as or otherwise support a means for receiving a set of SRSs over a set of SRS resources. In some examples, to support transmitting the control message indicating the at least two precoding matrices and the set of weighting coefficients, the SRI component 1345 may be configured as or otherwise support a means for transmitting the control message indicating at least two SRIs corresponding to the at least two precoding matrices.

Figure 14:
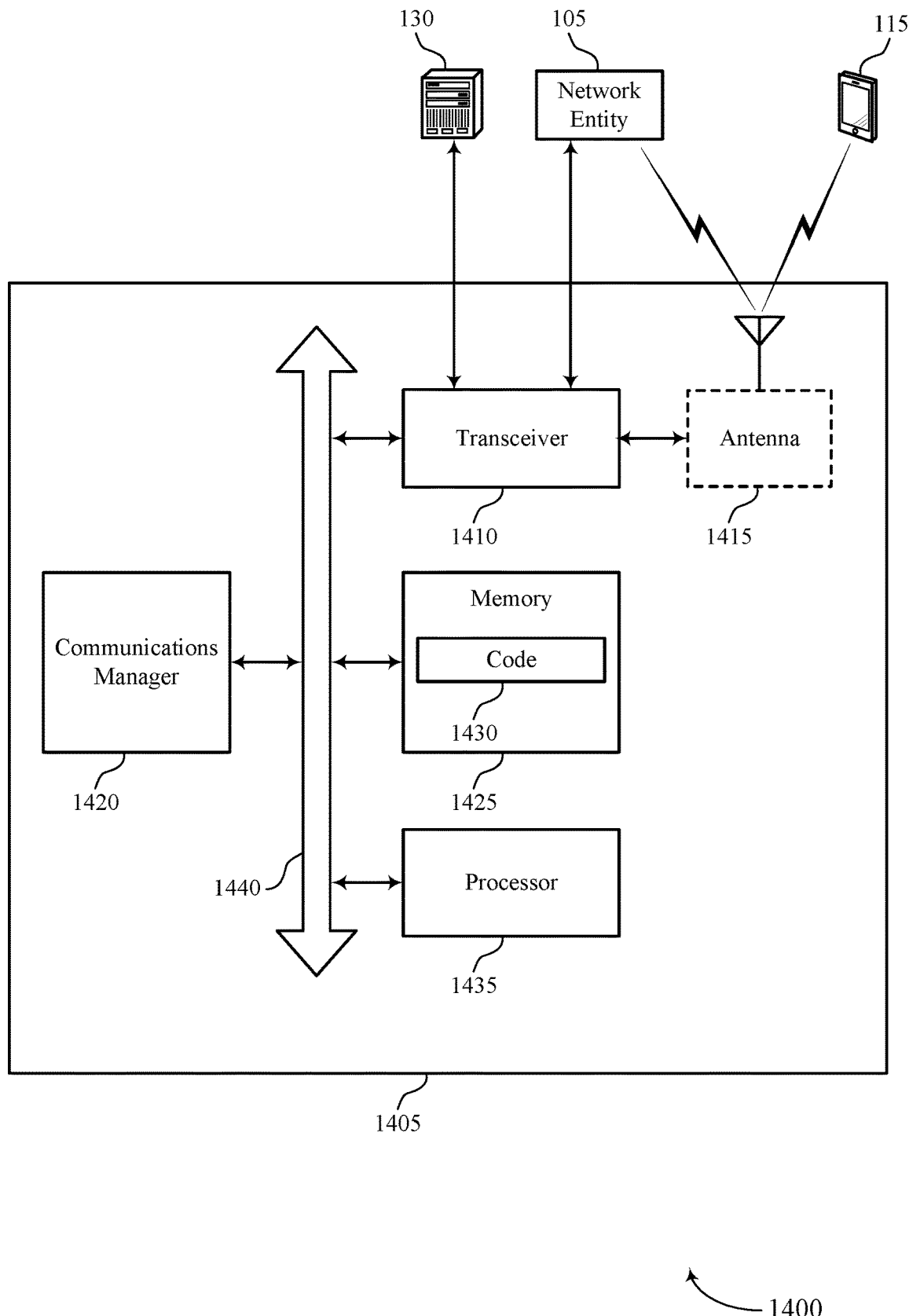
FIG. 14 shows a diagram of a system including a device that supports precoder prediction for uplink transmission enhancement in accordance with one or more aspects of the present disclosure.

FIG. 14 shows a diagram of a system 1400 including a device 1405 that supports precoder prediction for uplink transmission enhancement in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals.

The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting precoder prediction for uplink transmission enhancement). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

For example, the communications manager 1420 may be configured as or otherwise support a means for transmitting a control message indicating at least two precoding matrices and a set of weighting coefficients for deriving a precoder for uplink transmission from the at least two precoding matrices. The communications manager 1420 may be configured as or otherwise support a means for receiving an uplink message, where the uplink message is precoded using the precoder.

By including or configuring the communications manager 1420 in accordance with examples as described herein, the device 1405 may support techniques for improved communication reliability, reduced latency, improved user experience related to reduced processing, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of precoder prediction for uplink transmission enhancement as described herein, or the processor 1435 and the memory 1425 may be otherwise configured to perform or support such operations.

Figure 15:
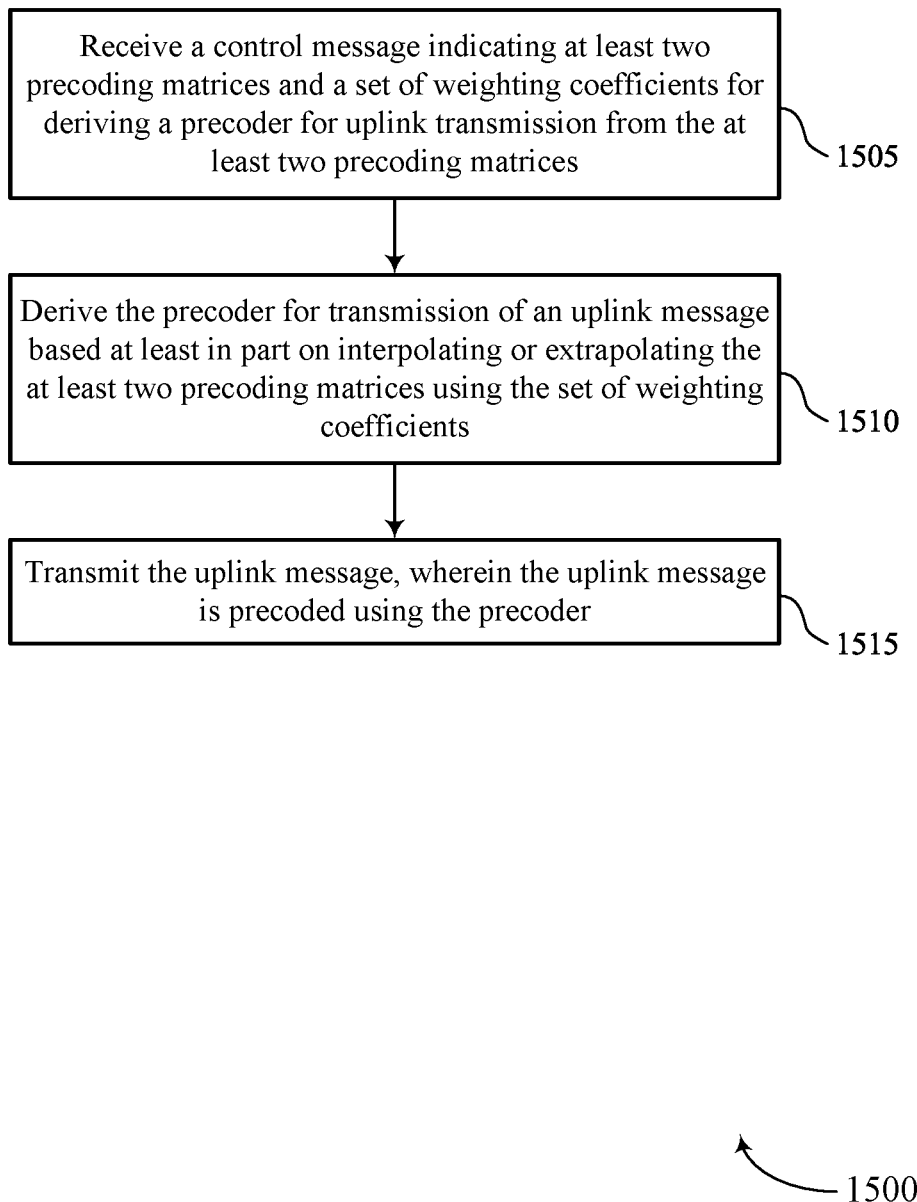
FIGS. 15 through 20 show flowcharts illustrating methods that support precoder prediction for uplink transmission enhancement in accordance with one or more aspects of the present disclosure.

FIG. 15 shows a flowchart illustrating a method 1500 that supports precoder prediction for uplink transmission enhancement in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a control message indicating at least two precoding matrices and a set of weighting coefficients for deriving a precoder for uplink transmission from the at least two precoding matrices. The operations of 1505 may be performed in accordance with examples as disclosed herein. In some examples, aspects of the operations of 1505 may be performed by a control message component 925 as described with reference to FIG. 9.

At 1510, the method may include deriving the precoder for transmission of an uplink message based on interpolating or extrapolating the at least two precoding matrices using the set of weighting coefficients. The operations of 1510 may be performed in accordance with examples as disclosed herein. In some examples, aspects of the operations of 1510 may be performed by a precoder deriving component 930 as described with reference to FIG. 9.

At 1515, the method may include transmitting the uplink message, where the uplink message is precoded using the precoder. The operations of 1515 may be performed in accordance with examples as disclosed herein. In some examples, aspects of the operations of 1515 may be performed by an uplink message component 935 as described with reference to FIG. 9.

Figure 16:
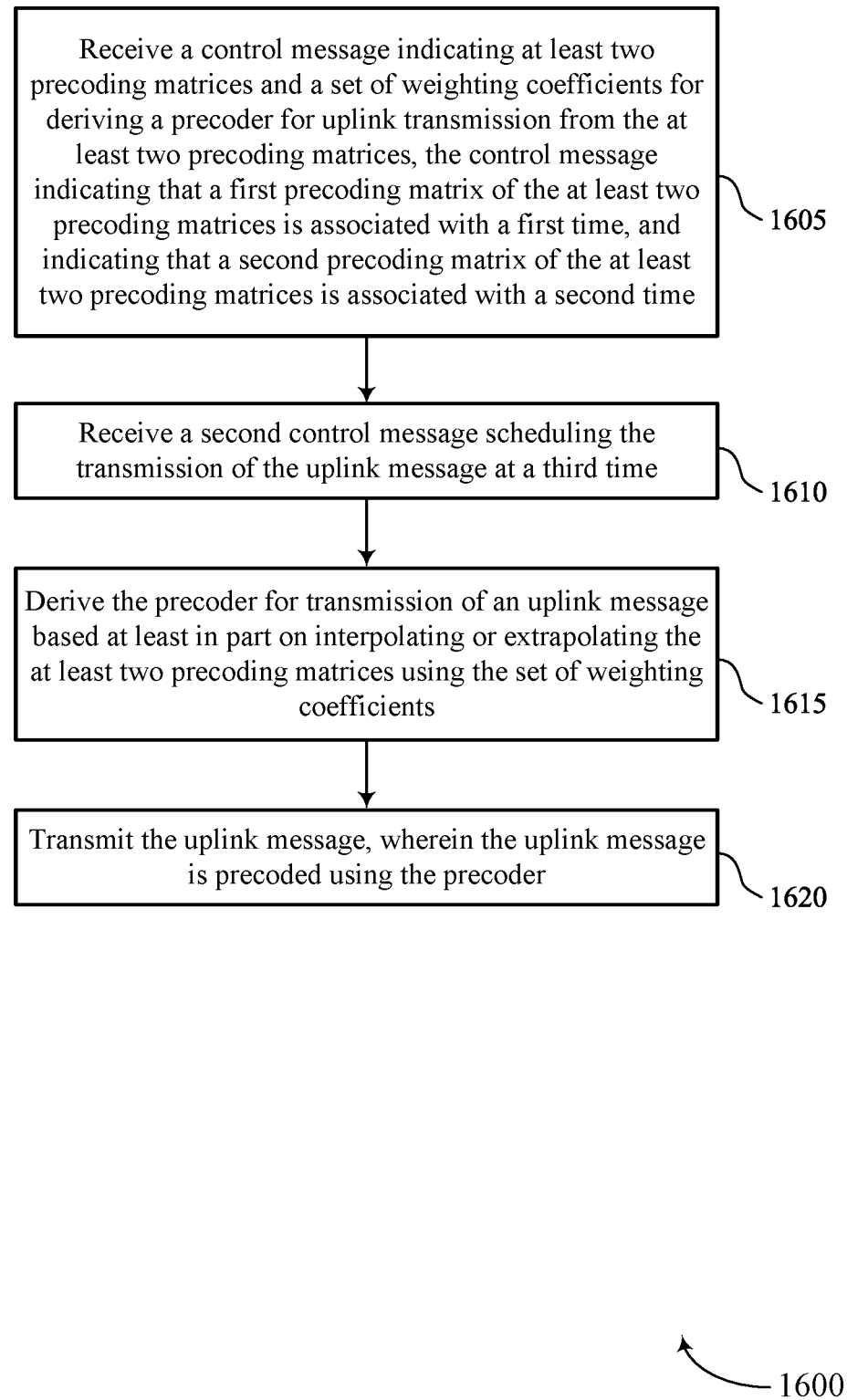

FIG. 16 shows a flowchart illustrating a method 1600 that supports precoder prediction for uplink transmission enhancement in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a control message indicating at least two precoding matrices and a set of weighting coefficients for deriving a precoder for uplink transmission from the at least two precoding matrices. The operations of 1605 may be performed in accordance with examples as disclosed herein. In some examples, aspects of the operations of 1605 may be performed by a control message component 925 as described with reference to FIG. 9.

At 1610, the method may include receiving the control message indicating that a first precoding matrix of the at least two precoding matrices is associated with a first time, and indicating that a second precoding matrix of the at least two precoding matrices is associated with a second time. The operations of 1610 may be performed in accordance with examples as disclosed herein. In some examples, aspects of the operations of 1610 may be performed by a control message component 925 as described with reference to FIG. 9.

At 1615, the method may include receiving a second control message scheduling the transmission of the uplink message at a third time. The operations of 1615 may be performed in accordance with examples as disclosed herein. In some examples, aspects of the operations of 1615 may be performed by a control message component 925 as described with reference to FIG. 9.

At 1620, the method may include deriving the precoder for transmission of an uplink message based on interpolating or extrapolating the at least two precoding matrices using the set of weighting coefficients. The operations of 1620 may be performed in accordance with examples as disclosed herein. In some examples, aspects of the operations of 1620 may be performed by a precoder deriving component 930 as described with reference to FIG. 9.

At 1625, the method may include transmitting the uplink message, where the uplink message is precoded using the precoder. The operations of 1625 may be performed in accordance with examples as disclosed herein. In some examples, aspects of the operations of 1625 may be performed by an uplink message component 935 as described with reference to FIG. 9.

Figure 17:
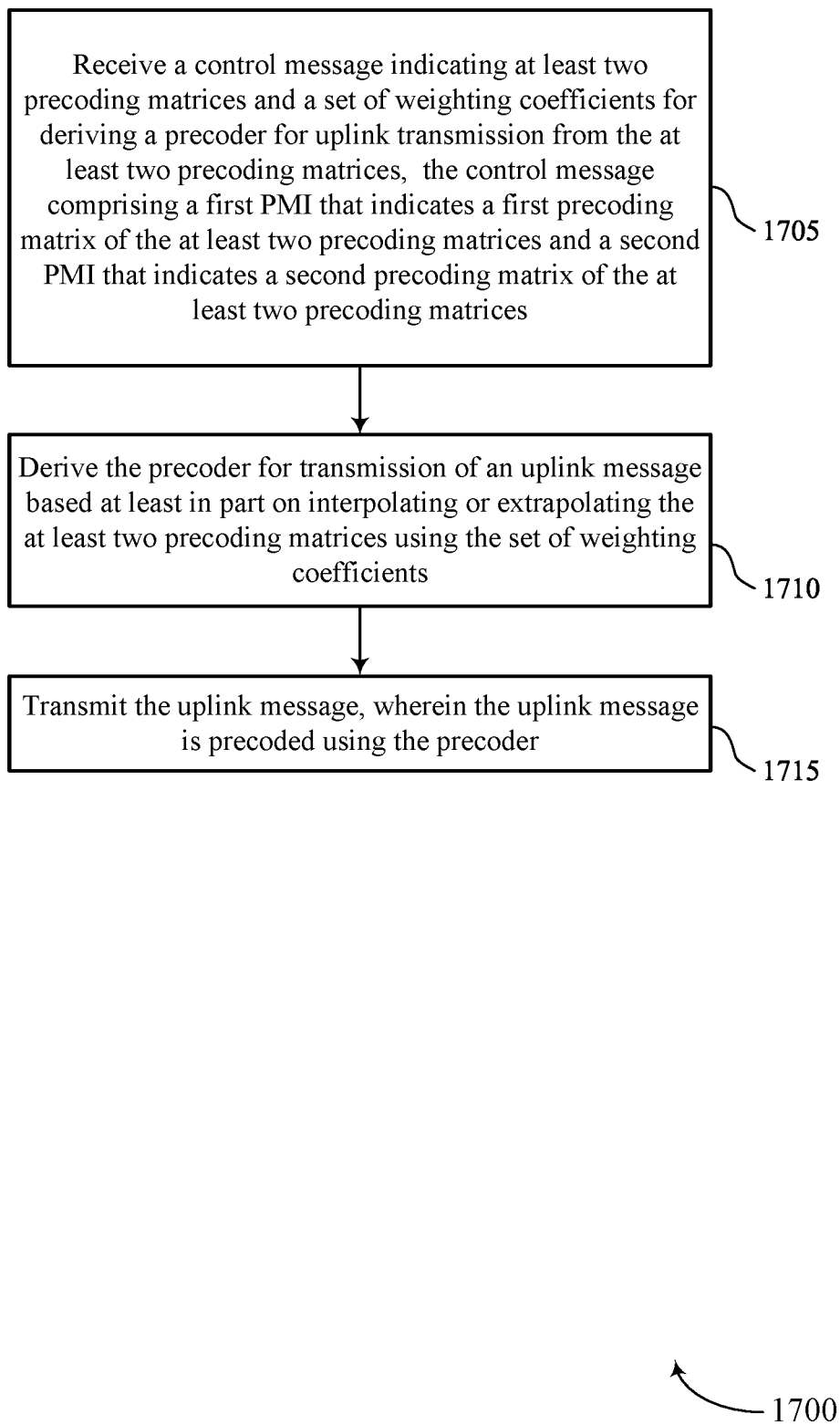

FIG. 17 shows a flowchart illustrating a method 1700 that supports precoder prediction for uplink transmission enhancement in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a control message indicating at least two precoding matrices and a set of weighting coefficients for deriving a precoder for uplink transmission from the at least two precoding matrices. The operations of 1705 may be performed in accordance with examples as disclosed herein. In some examples, aspects of the operations of 1705 may be performed by a control message component 925 as described with reference to FIG. 9.

At 1710, the method may include receiving the control message including a first PMI that indicates a first precoding matrix of the at least two precoding matrices and a second PMI that indicates a second precoding matrix of the at least two precoding matrices. The operations of 1710 may be performed in accordance with examples as disclosed herein. In some examples, aspects of the operations of 1710 may be performed by a control message component 925 as described with reference to FIG. 9.

At 1715, the method may include deriving the precoder for transmission of an uplink message based on interpolating or extrapolating the at least two precoding matrices using the set of weighting coefficients. The operations of 1715 may be performed in accordance with examples as disclosed herein. In some examples, aspects of the operations of 1715 may be performed by a precoder deriving component 930 as described with reference to FIG. 9.

At 1720, the method may include transmitting the uplink message, where the uplink message is precoded using the precoder. The operations of 1720 may be performed in accordance with examples as disclosed herein. In some examples, aspects of the operations of 1720 may be performed by an uplink message component 935 as described with reference to FIG. 9.

Figure 18:
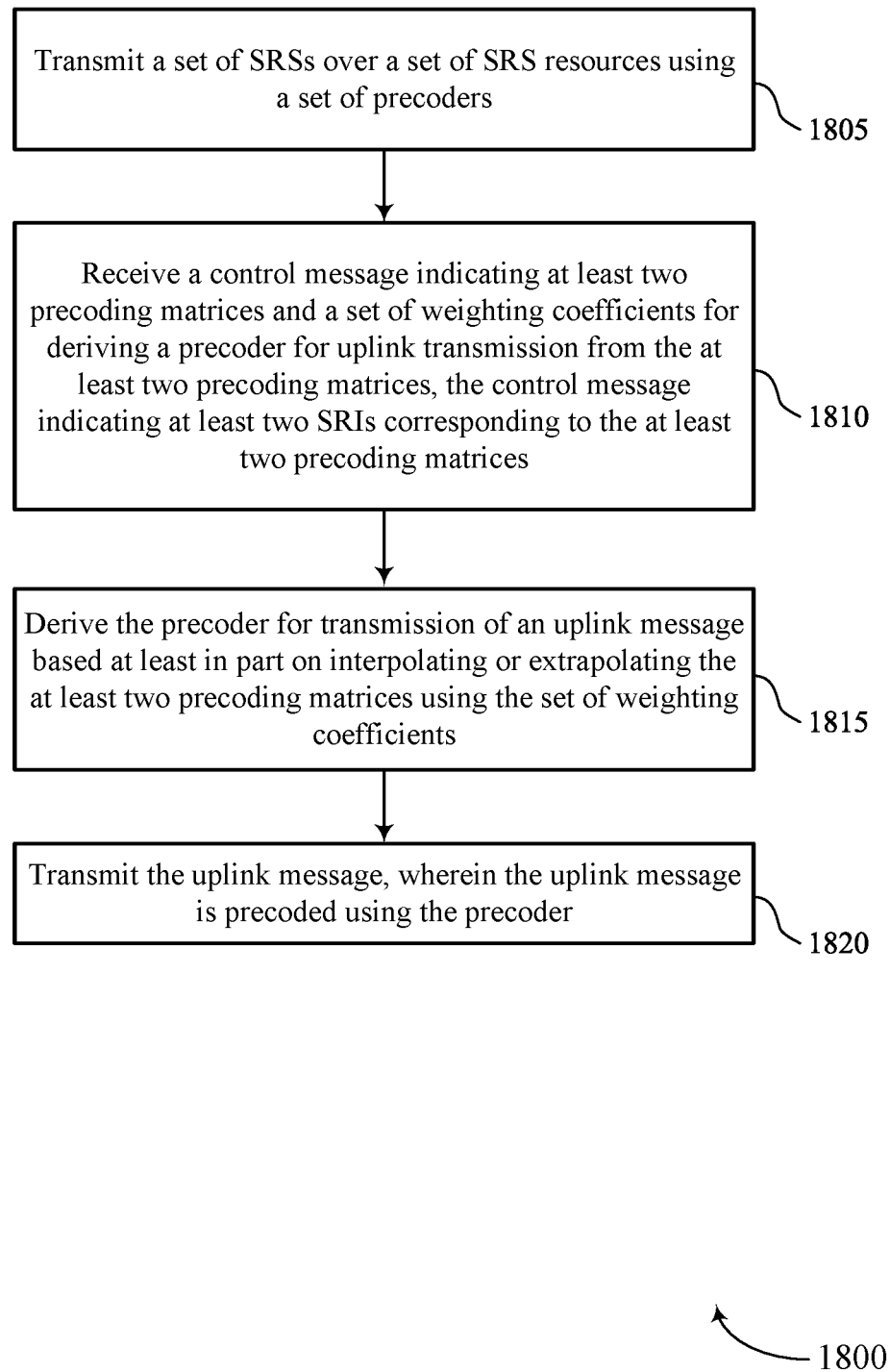

FIG. 18 shows a flowchart illustrating a method 1800 that supports precoder prediction for uplink transmission enhancement in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include transmitting a set of SRSs over a set of SRS resources using a set of precoders. The operations of 1805 may be performed in accordance with examples as disclosed herein. In some examples, aspects of the operations of 1805 may be performed by an SRS component 940 as described with reference to FIG. 9.

At 1810, the method may include receiving a control message indicating at least two precoding matrices and a set of weighting coefficients for deriving a precoder for uplink transmission from the at least two precoding matrices. The operations of 1810 may be performed in accordance with examples as disclosed herein. In some examples, aspects of the operations of 1810 may be performed by a control message component 925 as described with reference to FIG. 9.

At 1815, the method may include receiving the control message indicating at least two SRIs corresponding to the at least two precoding matrices. The operations of 1815 may be performed in accordance with examples as disclosed herein. In some examples, aspects of the operations of 1815 may be performed by a control message component 925 as described with reference to FIG. 9.

At 1820, the method may include deriving the precoder for transmission of an uplink message based on interpolating or extrapolating the at least two precoding matrices using the set of weighting coefficients. The operations of 1820 may be performed in accordance with examples as disclosed herein. In some examples, aspects of the operations of 1820 may be performed by a precoder deriving component 930 as described with reference to FIG. 9.

At 1825, the method may include transmitting the uplink message, where the uplink message is precoded using the precoder. The operations of 1825 may be performed in accordance with examples as disclosed herein. In some examples, aspects of the operations of 1825 may be performed by an uplink message component 935 as described with reference to FIG. 9.

Figure 19:
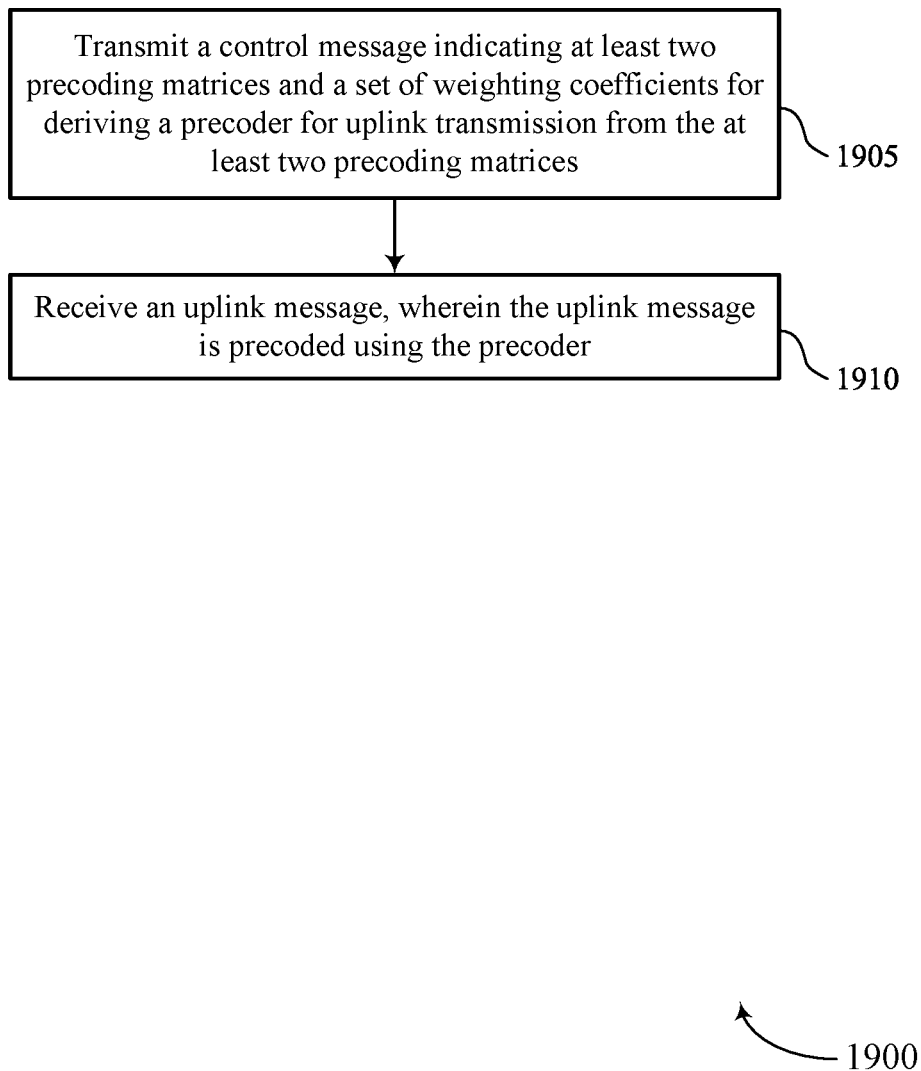

FIG. 19 shows a flowchart illustrating a method 1900 that supports precoder prediction for uplink transmission enhancement in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a control message indicating at least two precoding matrices and a set of weighting coefficients for deriving a precoder for uplink transmission from the at least two precoding matrices. The operations of 1905 may be performed in accordance with examples as disclosed herein. In some examples, aspects of the operations of 1905 may be performed by an indication component 1325 as described with reference to FIG. 13.

At 1910, the method may include receiving an uplink message, where the uplink message is precoded using the precoder. The operations of 1910 may be performed in accordance with examples as disclosed herein. In some examples, aspects of the operations of 1910 may be performed by a precoded uplink message component 1330 as described with reference to FIG. 13.

Figure 20:
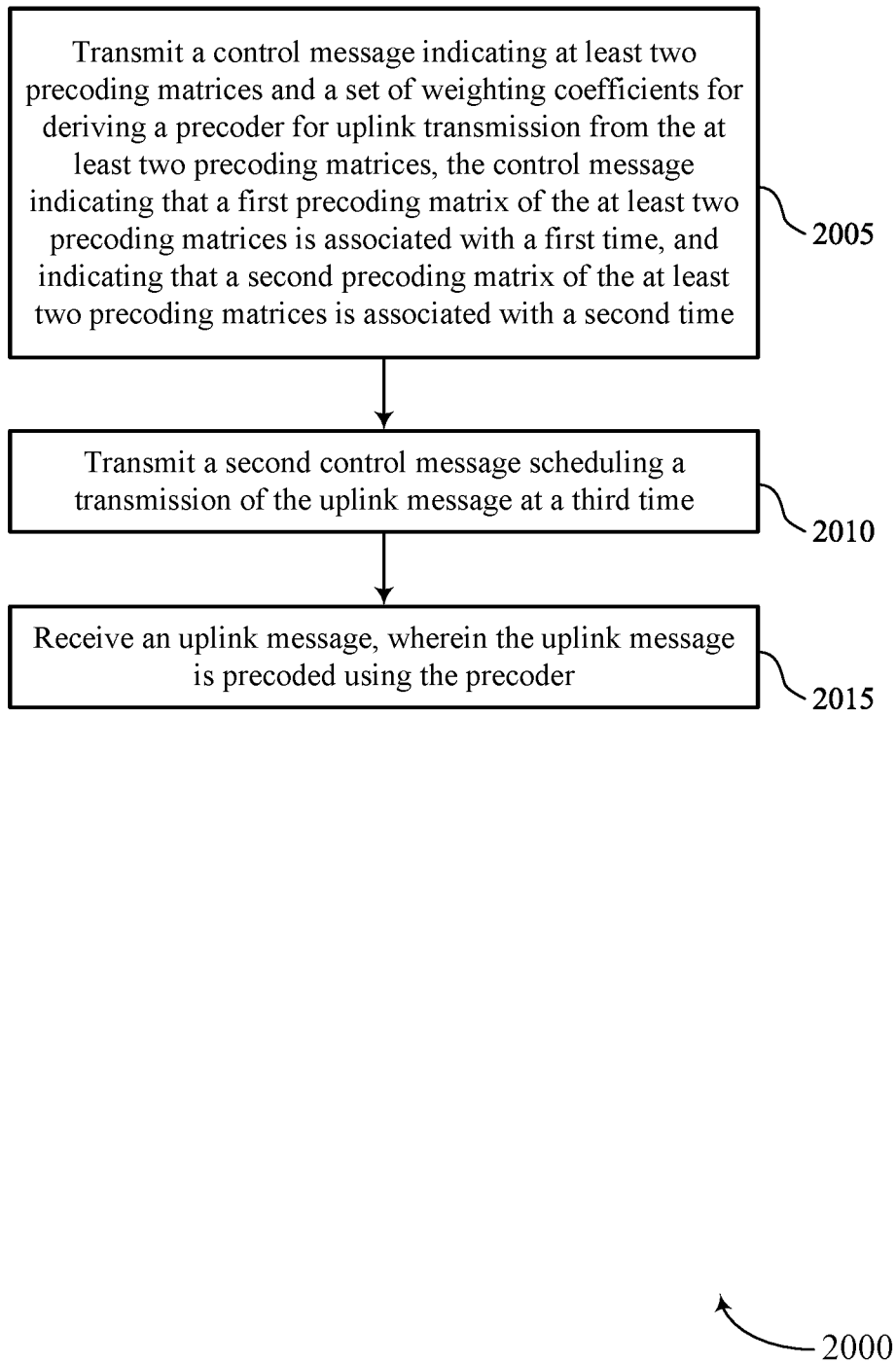

FIG. 20 shows a flowchart illustrating a method 2000 that supports precoder prediction for uplink transmission enhancement in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a control message indicating at least two precoding matrices and a set of weighting coefficients for deriving a precoder for uplink transmission from the at least two precoding matrices. The operations of 2005 may be performed in accordance with examples as disclosed herein. In some examples, aspects of the operations of 2005 may be performed by an indication component 1325 as described with reference to FIG. 13.

At 2010, the method may include transmitting the control message indicating that a first precoding matrix of the at least two precoding matrices is associated with a first time, and indicating that a second precoding matrix of the at least two precoding matrices is associated with a second time. The operations of 2010 may be performed in accordance with examples as disclosed herein. In some examples, aspects of the operations of 2010 may be performed by an indication component 1325 as described with reference to FIG. 13.

At 2015, the method may include transmitting a second control message scheduling a transmission of the uplink message at a third time. The operations of 2015 may be performed in accordance with examples as disclosed herein. In some examples, aspects of the operations of 2015 may be performed by a scheduling component 1335 as described with reference to FIG. 13.

At 2020, the method may include receiving an uplink message, where the uplink message is precoded using the precoder. The operations of 2020 may be performed in accordance with examples as disclosed herein. In some examples, aspects of the operations of 2020 may be performed by a precoded uplink message component 1330 as described with reference to FIG. 13.

The following provides an overview of aspects of the present disclosure:

Aspect 1: A method for wireless communication at a UE, comprising: receiving a control message indicating at least two precoding matrices and a set of weighting coefficients for deriving a precoder for uplink transmission from the at least two precoding matrices; deriving the precoder for transmission of an uplink message based at least in part on interpolating or extrapolating the at least two precoding matrices using the set of weighting coefficients; and transmitting the uplink message, wherein the uplink message is precoded using the precoder.

Aspect 2: The method of aspect 1, wherein receiving the control message indicating the at least two precoding matrices and the set of weighting coefficients comprises: receiving the control message indicating that a first precoding matrix of the at least two precoding matrices is associated with a first time, and indicating that a second precoding matrix of the at least two precoding matrices is associated with a second time;

and receiving a second control message scheduling the transmission of the uplink message at a third time.

Aspect 3: The method of aspect 2, wherein deriving the precoder for the transmission of the uplink message comprises: deriving the precoder for the transmission of the uplink message based at least in part on interpolating the first precoding matrix and the second precoding matrix using the set of weighting coefficients, wherein the third time occurs between the first time associated with the first precoding matrix and the second time associated with the second precoding matrix.

Aspect 4: The method of aspect 2, wherein deriving the precoder for the transmission of the uplink message comprises: deriving the precoder for the transmission of the uplink message based at least in part on extrapolating the first precoding matrix and the second precoding matrix using the set of weighting coefficients, wherein the third time occurs subsequent to both the first time associated with the first precoding matrix and the second time associated with the second precoding matrix.

Aspect 5: The method of any of aspects 1 through 4, wherein receiving the control message indicating the at least two precoding matrices and the set of weighting coefficients comprises: receiving the control message comprising a first PMI that indicates a first precoding matrix of the at least two precoding matrices and a second PMI that indicates a second precoding matrix of the at least two precoding matrices.

Aspect 6: The method of aspect 5, wherein the control message includes at least two bitmaps that respectively correspond to the first PMI and the second PMI.

Aspect 7: The method of aspect 5, wherein the control message includes a bitmap corresponding to the first PMI and a bitmap offset relative to the bitmap for determining the second PMI.

Aspect 8: The method of aspect 1, wherein receiving the control message indicating the at least two precoding matrices and the set of weighting coefficients comprises: receiving the control message that schedules a set of uplink message transmissions at a plurality of times.

Aspect 9: The method of aspect 8, further comprising: deriving the precoder for each uplink message transmission of the set of uplink message transmissions based at least in part on interpolating or extrapolating the at least two precoding matrices using the set of weighting coefficients in accordance with a rule, the rule pertaining to a timing offset between a time in which the control message is received and a respective time in which each uplink message transmission of the set of uplink message transmissions is scheduled.

Aspect 10: The method of any of aspects 8 through 9, further comprising: receiving a second control message indicating activation of resources for transmission of the set of uplink message transmissions; and deriving the precoder for each uplink message transmission of the set of uplink message transmissions based at least in part on interpolating or extrapolating the at least two precoding matrices using the set of weighting coefficients in accordance with a rule, the rule pertaining to a timing offset between a time in which the second control message is received and a respective time in which a respective uplink message transmission of the set of uplink message transmissions is scheduled.

Aspect 11: The method of any of aspects 1 through 4, wherein receiving the control message indicating the at least two precoding matrices and the set of weighting coefficients comprises: transmitting a set of SRSs over a set of SRS resources using a set of precoders; and receiving the control message indicating at least two SRIs corresponding to the at least two precoding matrices.

Aspect 12: A method for wireless communication at a network entity comprising: transmitting a control message indicating at least two precoding matrices and a set of weighting coefficients for deriving a precoder for uplink transmission from the at least two precoding matrices; and receiving an uplink message, wherein the uplink message is precoded using the precoder.

Aspect 13: The method of aspect 12, wherein transmitting the control message indicating the at least two precoding matrices and the set of weighting coefficients comprises: transmitting the control message indicating that a first precoding matrix of the at least two precoding matrices is associated with a first time, and indicating that a second precoding matrix of the at least two precoding matrices is associated with a second time; and transmitting a second control message scheduling a transmission of the uplink message at a third time.

Aspect 14: The method of any of aspects 12 through 13, wherein transmitting the control message indicating the at least two precoding matrices and the set of weighting coefficients comprises: transmitting the control message comprising a first PMI that indicates a first precoding matrix of the at least two precoding matrices and a second PMI that indicates a second precoding matrix of the at least two precoding matrices.

Aspect 15: The method of aspect 14, wherein the control message includes at least two bitmaps that respectively correspond to the first PMI and the second PMI.

Aspect 16: The method of aspect 14, wherein the control message includes a bitmap corresponding to the first PMI and a bitmap offset relative to the bitmap for determining the second PMI.

Aspect 17: The method of aspect 12, wherein transmitting the control message indicating the at least two precoding matrices and the set of weighting coefficients comprises: transmitting the control message that schedules a set of uplink message transmissions at a plurality of times.

Aspect 18: The method of aspect 17, further comprising: transmitting a second control message indication activation of resources for transmission of the set of uplink message transmissions.

Aspect 19: The method of any of aspects 12 through 13, wherein transmitting the control message indicating the at least two precoding matrices and the set of weighting coefficients comprises: receiving a set of SRSs over a set of SRS resources; and transmitting the control message indicating at least two SRIs corresponding to the at least two precoding matrices.

Aspect 20: An apparatus for wireless communication at a UE, comprising a processor; memory coupled with the processor; and instructions stored in the memory and executable by the processor to cause the apparatus to perform a method of any of aspects 1 through 11.

Aspect 21: An apparatus for wireless communication at a UE, comprising at least one means for performing a method of any of aspects 1 through 11.

Aspect 22: A non-transitory computer-readable medium storing code for wireless communication at a UE, the code comprising instructions executable by a processor to perform a method of any of aspects 1 through 11.

Aspect 23: An apparatus comprising a processor; memory coupled with the processor; and instructions stored in the memory and executable by the processor to cause the apparatus to perform a method of any of aspects 12 through 19.

Aspect 24: An apparatus comprising at least one means for performing a method of any of aspects 12 through 19.

Aspect 25: A non-transitory computer-readable medium storing code the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a control message indicating at least two precoding matrices and a set of weighting coefficients for deriving a precoder for uplink transmission from the at least two precoding matrices;
   deriving the precoder for transmission of an uplink message based at least in part on interpolating or extrapolating the at least two precoding matrices using the set of weighting coefficients; and
   transmitting the uplink message, wherein the uplink message is precoded using the precoder.

2. The method of claim 1, wherein receiving the control message indicating the at least two precoding matrices and the set of weighting coefficients comprises:
   receiving the control message indicating that a first precoding matrix of the at least two precoding matrices is associated with a first time, and indicating that a second precoding matrix of the at least two precoding matrices is associated with a second time; and
   receiving a second control message scheduling the transmission of the uplink message at a third time.

3. The method of claim 2, wherein deriving the precoder for the transmission of the uplink message comprises:
   deriving the precoder for the transmission of the uplink message based at least in part on interpolating the first precoding matrix and the second precoding matrix using the set of weighting coefficients, wherein the third time occurs between the first time associated with the first precoding matrix and the second time associated with the second precoding matrix.

4. The method of claim 2, wherein deriving the precoder for the transmission of the uplink message comprises:
   deriving the precoder for the transmission of the uplink message based at least in part on extrapolating the first precoding matrix and the second precoding matrix using the set of weighting coefficients, wherein the third time occurs subsequent to both the first time associated with the first precoding matrix and the second time associated with the second precoding matrix.

5. The method of claim 1, wherein receiving the control message indicating the at least two precoding matrices and the set of weighting coefficients comprises:
   receiving the control message comprising a first precoding matrix indicator that indicates a first precoding matrix of the at least two precoding matrices and a second precoding matrix indicator that indicates a second precoding matrix of the at least two precoding matrices.

6. The method of claim 5, wherein the control message includes at least two bitmaps that respectively correspond to the first precoding matrix indicator and the second precoding matrix indicator.

7. The method of claim 5, wherein the control message includes a bitmap corresponding to the first precoding matrix indicator and a bitmap offset relative to the bitmap for determining the second precoding matrix indicator.

8. The method of claim 1, wherein receiving the control message indicating the at least two precoding matrices and the set of weighting coefficients comprises:
   receiving the control message that schedules a set of uplink message transmissions at a plurality of times.

9. The method of claim 8, further comprising:
   deriving the precoder for each uplink message transmission of the set of uplink message transmissions based at least in part on interpolating or extrapolating the at least two precoding matrices using the set of weighting coefficients in accordance with a rule, the rule pertaining to a timing offset between a time in which the control message is received and a respective time in which each uplink message transmission of the set of uplink message transmissions is scheduled.

10. The method of claim 8, further comprising:
    receiving a second control message indicating activation of resources for transmission of the set of uplink message transmissions; and
    deriving the precoder for each uplink message transmission of the set of uplink message transmissions based at least in part on interpolating or extrapolating the at least two precoding matrices using the set of weighting coefficients in accordance with a rule, the rule pertaining to a timing offset between a time in which the second control message is received and a respective time in which a respective uplink message transmission of the set of uplink message transmissions is scheduled.

11. The method of claim 1, wherein receiving the control message indicating the at least two precoding matrices and the set of weighting coefficients comprises:
    transmitting a set of sounding reference signals over a set of sounding reference signal resources using a set of precoders; and
    receiving the control message indicating at least two sounding reference signal resource indicators corresponding to the at least two precoding matrices.

12. A method for wireless communication at a network entity comprising:
    transmitting a control message indicating at least two precoding matrices and a set of weighting coefficients for deriving a precoder for uplink transmission from the at least two precoding matrices, wherein transmitting the control message indicating the at least two precoding matrices and the set of weighting coefficients comprises:
       transmitting the control message indicating that a first precoding matrix of the at least two precoding matrices is associated with a first time, and indicating that a second precoding matrix of the at least two precoding matrices is associated with a second time; and
       transmitting a second control message scheduling a transmission of the uplink message at a third time; and
    receiving an uplink message, wherein the uplink message is precoded using the precoder.

13. The method of claim 12, wherein transmitting the control message indicating the at least two precoding matrices and the set of weighting coefficients comprises:
  transmitting the control message comprising a first precoding matrix indicator that indicates a first precoding matrix of the at least two precoding matrices and a second precoding matrix indicator that indicates a second precoding matrix of the at least two precoding matrices.

14. The method of claim 13, wherein the control message includes at least two bitmaps that respectively correspond to the first precoding matrix indicator and the second precoding matrix indicator.

15. The method of claim 13, wherein the control message includes a bitmap corresponding to the first precoding matrix indicator and a bitmap offset relative to the bitmap for determining the second precoding matrix indicator.

16. The method of claim 12, wherein transmitting the control message indicating the at least two precoding matrices and the set of weighting coefficients comprises:
  transmitting the control message that schedules a set of uplink message transmissions at a plurality of times.

17. The method of claim 16, further comprising:
  transmitting a second control message indication activation of resources for transmission of the set of uplink message transmissions.

18. The method of claim 12, wherein transmitting the control message indicating the at least two precoding matrices and the set of weighting coefficients comprises:
  receiving a set of sounding reference signals over a set of sounding reference signal resources; and
  transmitting the control message indicating at least two sounding reference signal resource indicators corresponding to the at least two precoding matrices.

19. An apparatus for wireless communication at a user equipment (UE), comprising:
  one or more processors;
  one or more memories coupled with the one or more processors; and
  instructions stored in the one or more memories and executable by the one or more processors to cause the apparatus to:
    receive a control message indicating at least two precoding matrices and a set of weighting coefficients for deriving a precoder for uplink transmission from the at least two precoding matrices;
    derive the precoder for transmission of an uplink message based at least in part on interpolating or extrapolating the at least two precoding matrices using the set of weighting coefficients; and
    transmit the uplink message, wherein the uplink message is precoded using the precoder.

20. The apparatus of claim 19, wherein the instructions to receive the control message indicating the at least two precoding matrices and the set of weighting coefficients are executable by the one or more processors to cause the apparatus to:
  receive the control message indicating that a first precoding matrix of the at least two precoding matrices is associated with a first time, and indicating that a second precoding matrix of the at least two precoding matrices is associated with a second time; and
  receive a second control message scheduling the transmission of the uplink message at a third time.

21. The apparatus of claim 20, wherein the instructions to derive the precoder for the transmission of the uplink message are executable by the one or more processors to cause the apparatus to:
  derive the precoder for the transmission of the uplink message based at least in part on interpolating the first precoding matrix and the second precoding matrix using the set of weighting coefficients, wherein the third time occurs between the first time associated with the first precoding matrix and the second time associated with the second precoding matrix.

22. The apparatus of claim 20, wherein the instructions to derive the precoder for the transmission of the uplink message are executable by the one or more processors to cause the apparatus to:
  derive the precoder for the transmission of the uplink message based at least in part on extrapolating the first precoding matrix and the second precoding matrix using the set of weighting coefficients, wherein the third time occurs subsequent to both the first time associated with the first precoding matrix and the second time associated with the second precoding matrix.

23. The apparatus of claim 19, wherein the instructions to receive the control message indicating the at least two precoding matrices and the set of weighting coefficients are executable by the one or more processors to cause the apparatus to:
  receive the control message comprising a first precoding matrix indicator that indicates a first precoding matrix of the at least two precoding matrices and a second precoding matrix indicator that indicates a second precoding matrix of the at least two precoding matrices.

24. The apparatus of claim 19, wherein the instructions to receive the control message indicating the at least two precoding matrices and the set of weighting coefficients are executable by the one or more processors to cause the apparatus to:
  receive the control message that schedules a set of uplink message transmissions at a plurality of times.

25. The apparatus of claim 19, wherein the instructions to receive the control message indicating the at least two precoding matrices and the set of weighting coefficients are executable by the one or more processors to cause the apparatus to:
  transmit a set of sounding reference signals over a set of sounding reference signal resources using a set of precoders; and
  receive the control message indicating at least two sounding reference signal resource indicators corresponding to the at least two precoding matrices.

26. An apparatus, comprising:
  one or more processors;
  one or more memories coupled with the one or more processors; and
  instructions stored in the one or more memories and executable by the one or more processors to cause the apparatus to:
    transmit a control message indicating at least two precoding matrices and a set of weighting coefficients for deriving a precoder for uplink transmission from the at least two precoding matrices, wherein the instructions to transmit the control message indicating the at least two precoding matrices and the set of weighting coefficients are executable by the one or more processors to cause the apparatus to:

transmit the control message indicating that a first precoding matrix of the at least two precoding matrices is associated with a first time, and indicating that a second precoding matrix of the at least two precoding matrices is associated with a second time; and transmit a second control message scheduling a transmission of the uplink message at a third time; and receive an uplink message, wherein the uplink message is precoded using the precoder.

27. The apparatus of claim 26, wherein the instructions to transmit the control message indicating the at least two precoding matrices and the set of weighting coefficients are executable by the one or more processors to cause the apparatus to:

transmit the control message comprising a first precoding matrix indicator that indicates a first precoding matrix of the at least two precoding matrices and a second precoding matrix indicator that indicates a second precoding matrix of the at least two precoding matrices.

28. The apparatus of claim 26, wherein the instructions to transmit the control message indicating the at least two precoding matrices and the set of weighting coefficients are executable by the one or more processors to cause the apparatus to:

receive a set of sounding reference signals over a set of sounding reference signal resources; and transmit the control message indicating at least two sounding reference signal resource indicators corresponding to the at least two precoding matrices.

* * * * *